United States Patent
Williams et al.

(10) Patent No.: US 7,483,031 B2
(45) Date of Patent: Jan. 27, 2009

(54) METHOD FOR SYNCHRONIZING GRAPHICS PROCESSING UNITS

(75) Inventors: Ian M. Williams, Menlo Park, CA (US); Dat T. Nguyen, Santa Clara, CA (US); Jeffrey Chandler Doughty, Austin, TX (US); Ralf Biermann, Aachen (DE); Kenneth Leon Adams, Jr., Durham, NC (US); Andrew B. Ritger, Washington, DC (US); Satish D. Salian, Santa Clara, CA (US); Fred D. Nicklisch, Wuerselen, CA (US)

(73) Assignee: NVIDIA Corporation, Santa Clara, CA (US)

( * ) Notice: Subject to any disclaimer, the term of this patent is extended or adjusted under 35 U.S.C. 154(b) by 701 days.

(21) Appl. No.: 10/730,727

(22) Filed: Dec. 8, 2003

(65) Prior Publication Data

US 2004/0207618 A1    Oct. 21, 2004

Related U.S. Application Data

(60) Provisional application No. 60/463,759, filed on Apr. 17, 2003.

(51) Int. Cl.
*G06F 15/16* (2006.01)
*G06F 15/80* (2006.01)

(52) U.S. Cl. .................. 345/502; 345/503; 345/504; 345/505

(58) Field of Classification Search .......... 713/400, 713/401; 345/502–505, 1.1, 1.2
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova et al. | |
| 5,638,531 A * | 6/1997 | Crump et al. | 711/123 |
| 5,977,989 A * | 11/1999 | Lee et al. | 345/546 |
| 6,305,805 B1 | 10/2001 | Liebenow | |
| 6,646,645 B2 * | 11/2003 | Simmonds et al. | 345/502 |
| 6,831,648 B2 * | 12/2004 | Mukherjee et al. | 345/504 |
| 2003/0103062 A1 * | 6/2003 | Lee et al. | 345/629 |
| 2004/0012600 A1 * | 1/2004 | Deering et al. | 345/506 |
| 2004/0137935 A1 | 7/2004 | Zarom | |

OTHER PUBLICATIONS

Definition of "Phase locked loop" from Answers.com.*
Holmes, Richard E.; Large Screen Color CRT Projection System with Digital Correction; SPIE vol. 760 Large Screen Projection Displays (1987).
Green, Mark; Lyon, Paul; A New Computer-Human Interface for Aligning and Edge-Matching Multichannel Projector Systems; SID 88 Digest May, 1988.
Lyon, Paul; Edge-Blending Multiple Projection Displays on a Dome Surface to Form Continuous Wide Angle Fields-of-View; Interservice/Industry Training Equipment Conference; Proceedings; Nov. 1985.
Rahul Sukthankar, "Smart Projectors: Camera-Projector Systems" http://www.cs.cmu.edu/~rahuls/Research/Projector/ May 21, 2002 pp. 1-3.

* cited by examiner

*Primary Examiner*—Kee M. Tung
*Assistant Examiner*—Hau H Nguyen
(74) *Attorney, Agent, or Firm*—Patterson & Sheridan, LLP

(57) ABSTRACT

A method for synchronizing two of more graphics processing units. The method includes the steps of determining whether the phase of a first timing signal of a first graphics processing unit and the phase of a second timing signal of a second graphics processing unit are synchronized, and adjusting the frequency of the first timing signal to the frequency of the second timing signal if the first timing signal and the second timing signal are not synchronized.

21 Claims, 27 Drawing Sheets

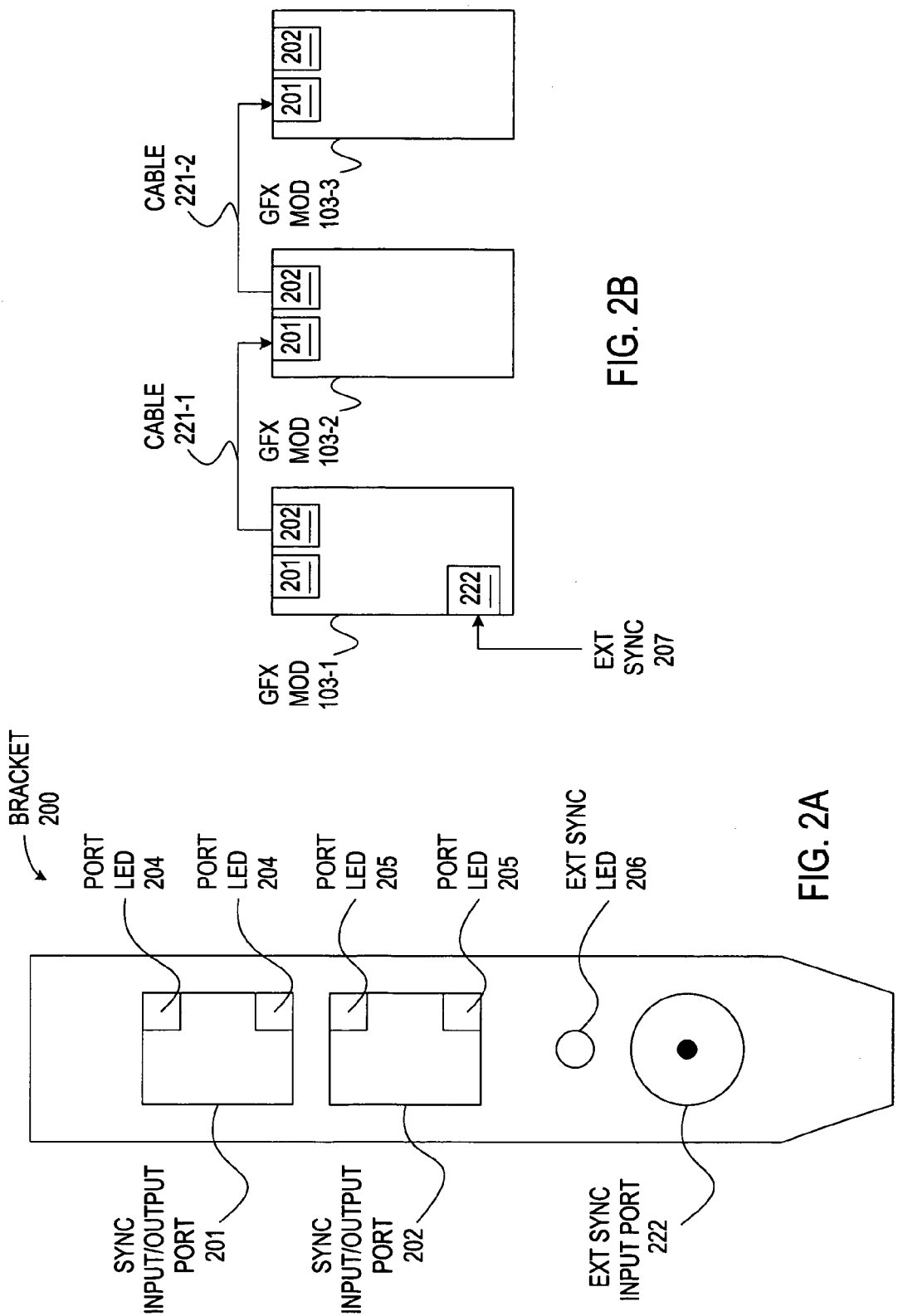

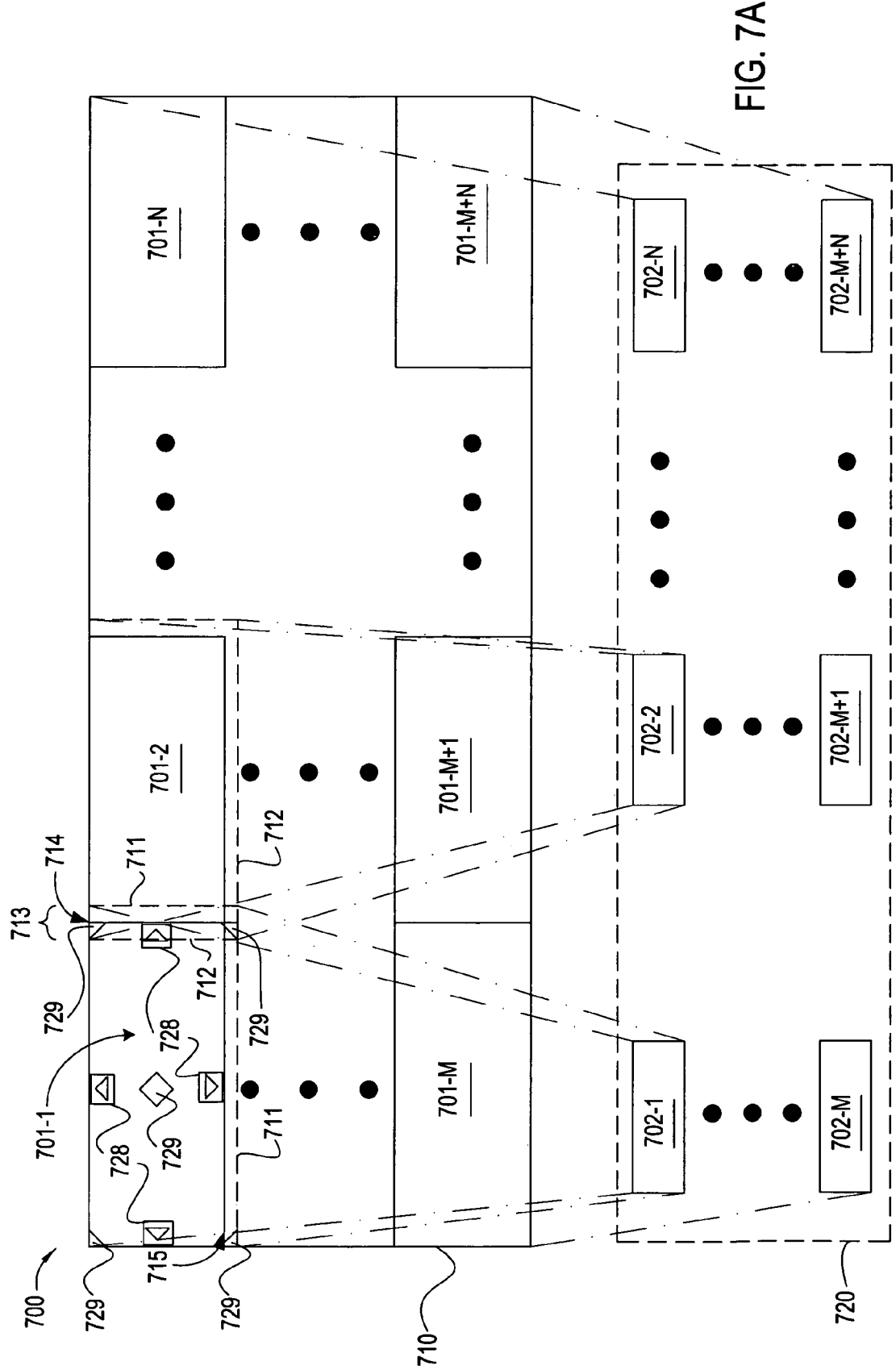

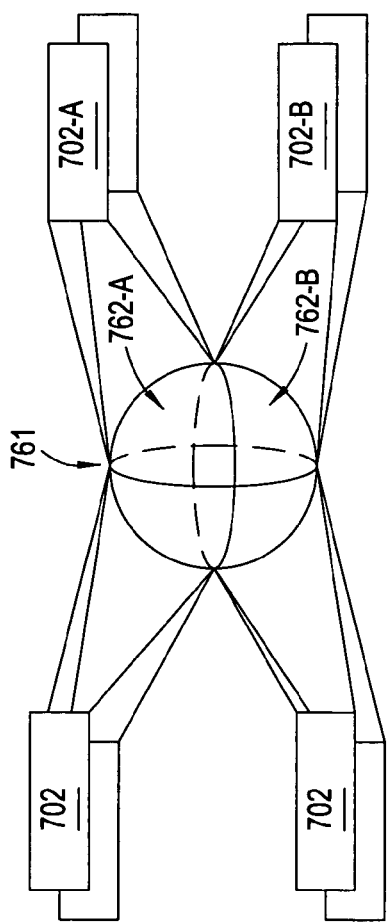
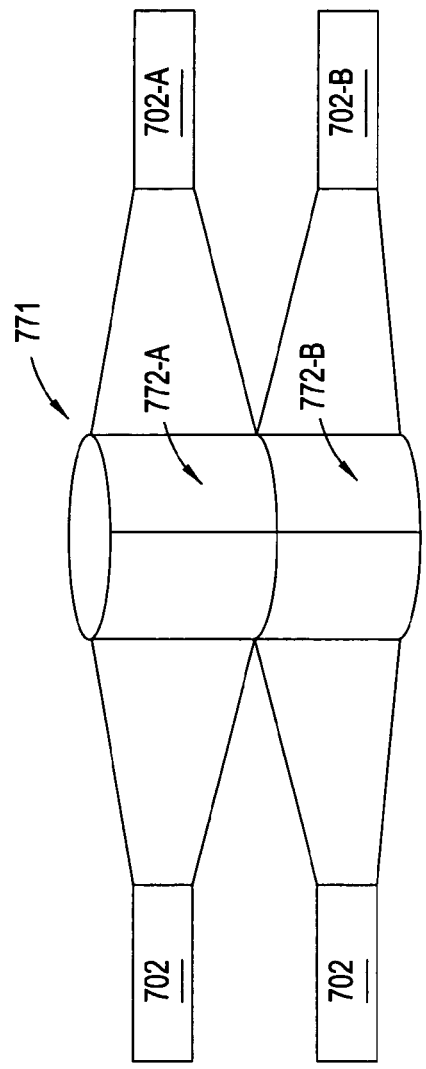
FIG. 7E
FIG. 7F

METHOD FOR SYNCHRONIZING GRAPHICS PROCESSING UNITS

CROSS-REFERENCE TO RELATED APPLICATIONS

This application claims benefit of U.S. provisional patent application Ser. No. 60/463,759, filed Apr. 17, 2003, and is related to commonly assigned U.S. patent application Ser. No. 10/185,764, entitled "METHOD AND APPARATUS FOR DISPLAY IMAGE ADJUSTMENT", filed Jun. 27, 2002, issued as U.S. Pat. No. 6,963,348, and commonly assigned U.S. patent application Ser. No. 10/625,812, entitled "PER-PIXEL OUTPUT LUMINOSITY COMPENSATION", filed Jul. 22, 2003, issued as U.S. Pat. No. 7,336,277, all of which are incorporated herein by reference.

FIELD OF THE INVENTION

Embodiments of the invention generally relate to image display and, more particularly, to coordination of graphics processor output for image display using a plurality of image elements.

BACKGROUND

Projecting or displaying an image using multiple projectors or display devices, respectively, can be problematic, especially with respect to interfaces of projected or displayed images and synchronization of images. These problems at the interfaces include intensity roll-off, image overlap and luminosity overlap (collectively and singly referred to as "seaming effects"). With respect to projected images, reducing seaming effects at projected image interfaces conventionally involves expensive equipment, including costly optical components. Likewise, with respect to displayed images, seaming effects at displayed image interfaces and synchronization of images conventionally involves expensive equipment, including costly application specific integrated circuits.

Accordingly, it would be desirable and useful to provide a less costly approach to solving one or more of seaming effects and synchronization for displayed and projected image arrays.

SUMMARY OF THE INVENTION

Embodiments of the invention are directed to a method for synchronizing two of more graphics processing units. The method includes the steps of determining whether the phase of a first timing signal of a first graphics processing unit and the phase of a second timing signal of a second graphics processing unit are synchronized, and adjusting the frequency of the first timing signal to the frequency of the second timing signal if the first timing signal and the second timing signal are not synchronized.

In one embodiment, the method further includes determining whether a first stereo field signal of the first graphics processing unit and a second stereo field signal of the second graphics processing unit are synchronized, and adjusting the phase of the first stereo field signal to the phase of the second stereo field signal if the first stereo field signal and the second stereo field signal are not synchronized.

In another embodiment, the method further includes synchronizing a swap ready signal of the first graphics processing unit with a swap ready signal of the second graphics processing unit.

Embodiments of the invention are also directed to a method for generating a synchronized timing signal in a graphics processing unit. The method includes the steps of receiving a clock signal from a clock generator and an external synchronization signal, determining whether the phase of the clock signal and the phase of the external synchronization signal are synchronized, and adjusting the frequency of the clock generator to the frequency of the external synchronization signal if the clock signal and the external synchronization signal are not synchronized, thereby generating the synchronized timing signal.

Embodiments of the invention are also directed to a method that includes receiving a frame divider, determining whether a swap ready element on at least one of the two or more graphics processing units is logically true, and performing a series of video memory block transfers if the swap ready element on the at least one of the two or more graphics processing units is logically true.

Embodiments of the invention are also directed to a method for scanning out data. The method includes the steps of receiving a frame divider, triggering a new video start address in a memory, determining whether a swap ready element on at least one of two or more graphics processing units is logically true, and scanning out data from the memory starting at the new video start address if the swap ready element on the at least one of the two or more graphics processing units is logically true.

In one embodiment, the method includes performing a series of video memory block transfers if the swap ready element on the at least one of the two or more graphics processing units is logically true.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a block diagram depicting an exemplary embodiment of input and output connections though a daughter card bracket of a graphics module shown in FIGS. 1A, 1B and 1C.

FIG. 2B is a block diagram depicting an exemplary embodiment of connectivity of input and output ports of FIG. 2A as applied to a multiple host computer system in accordance with one embodiment of the invention.

FIG. 7A is a block diagram depicting an exemplary embodiment of an array of projectors arranged to collectively form an image from respective projected image elements.

FIG. 7E is a front perspective view depicting an exemplary embodiment of projection onto a spherical surface.

FIG. 7F is a front perspective view depicting an exemplary embodiment of projection onto a portion of a cylindrical surface.

DETAILED DESCRIPTION OF THE PREFERRED EMBODIMENT

Figure 1A:
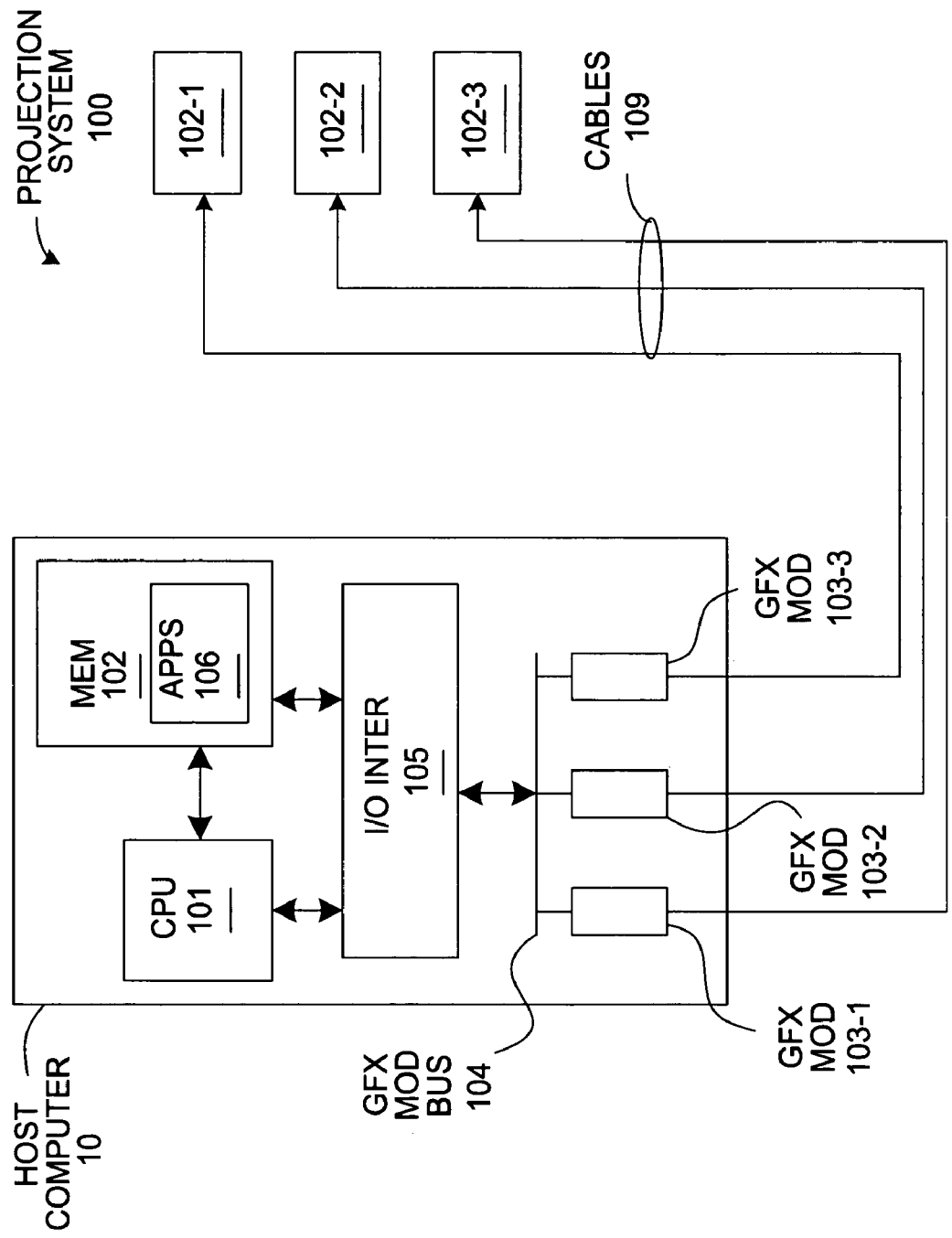
FIG. 1A is a block diagram depicting a projection system having a host computer with graphics modules in accordance with one embodiment of the invention.

FIG. 1A is a block diagram depicting a projection system 100 having a host computer 10 with graphics modules ("GFX MOD") 103-1, 103-2 and 103-3 in accordance with one embodiment of the invention. The host computer 10 is coupled to projectors 102-1, 102-2 and 102-3 via respective cables 109. Though three projectors 102-1, 102-2 and 102-3 are shown, fewer or more projectors may be used.

The host computer 10 includes one or more microprocessors ("CPU") 101, memory ("MEM") 102 and input/output ("I/O") interface 105. As mentioned above, the host computer 10 includes graphics modules 103-1, 103-2 and 103-3, which are synchronized for synchronously controlling image content provided to multiple projectors 102. Though three graphics modules 103 are shown, fewer or more graphics modules may be used. Further, though a one-to-one correspondence is shown as between graphics modules 103 and projectors 102, a more than one-to-one correspondence may be used where graphics modules 103 are configured to provide scan out to more than one display or projector, or combination thereof.

The graphics modules 103 are coupled to I/O interface 105 via graphics module bus 104 for communication with memory 102 and CPU 101. Though applications ("APPS") 106 are shown located in memory 102, it should be appreciated that elements of applications 106 from time-to-time exist in CPU 101, I/O interface 105 or graphics modules 103. Applications 106 may also be used to provide image content for projection.

Figure 1B:
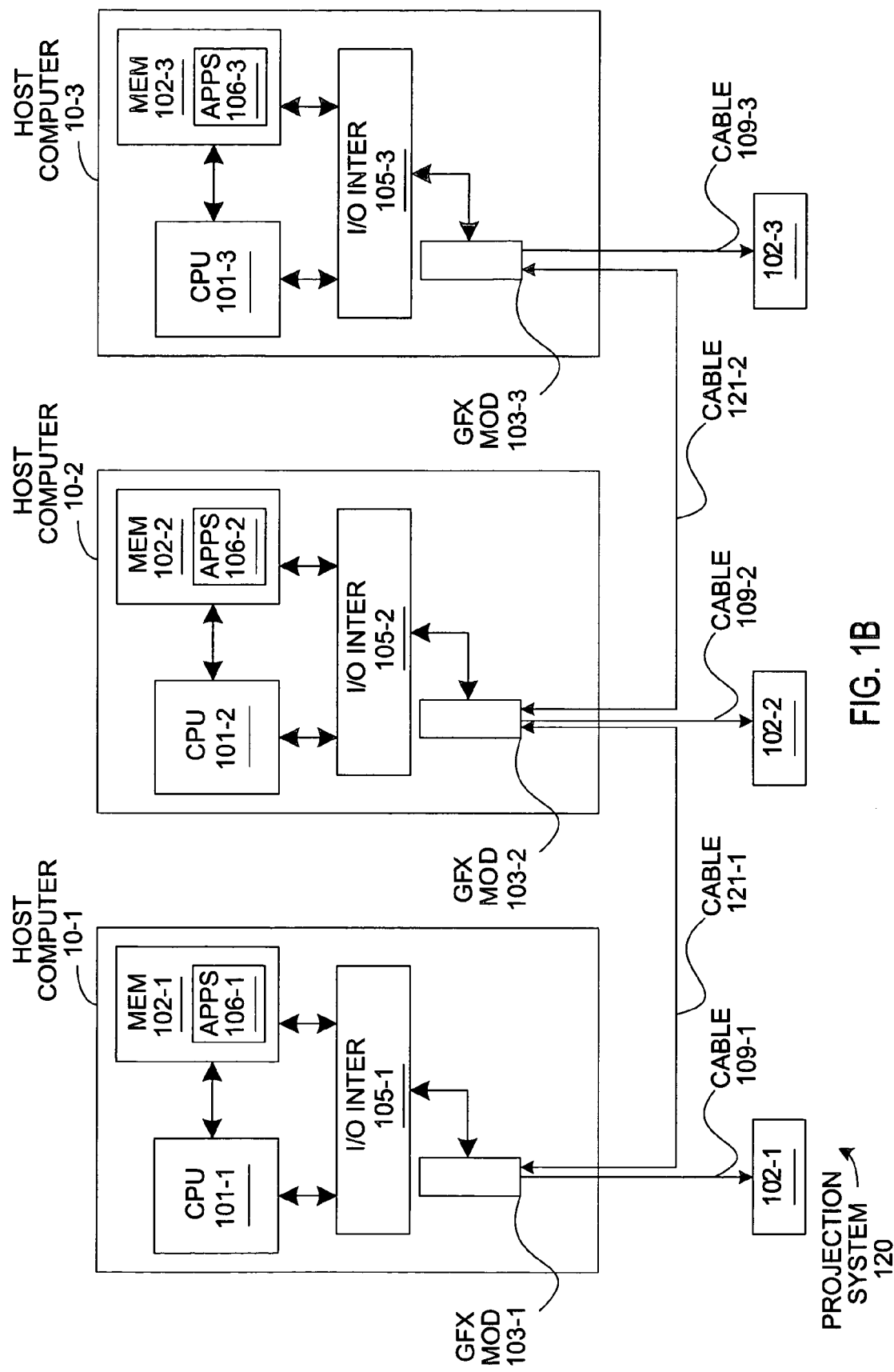
FIG. 1B is a block diagram depicting an exemplary embodiment of a projection system having host computers each with a respective graphics module for respectively controlling projectors.

FIG. 1B is a block diagram depicting a projection system 120 having host computers 10-1, 10-2 and 10-3, each with a respective graphics-module 103-1, 103-2 and 103-3 for respectively controlling projectors 102-1, 102-2 and 102-3 in accordance with one embodiment of the invention. As much of projection system 120 is similar to projection system 100 of FIG. 1A, redundant description is not repeated.

In contrast to projection system 100 of FIG. 1A, projection system 120 has multiple host computers 10, where each includes a graphics module 103 coupled to a respective projector 102 via a respective cable 109. Accordingly, each graphics module 103 is coupled to a respective I/O interface 105 for communication with a respective CPU 101, memory 102 and applications 106. Applications 106 among host computers 10-1, 10-2 and 10-3 may have different image content for display by respective projectors 102 for forming an image. Alternatively, applications 106 may have the same image content, where respective portions of the same image content are projected for forming an image. Additionally, host computers 10-1, 10-2 and 10-3 are coupled to one another, or more particularly, graphics modules 103 are coupled to one another via cables 121. So, graphics module 103-1 is coupled to graphics module 103-2 via cable 121-1, and graphics module 103-2 is coupled to graphics module 103-3 via cable 121-2.

Figure 1C:
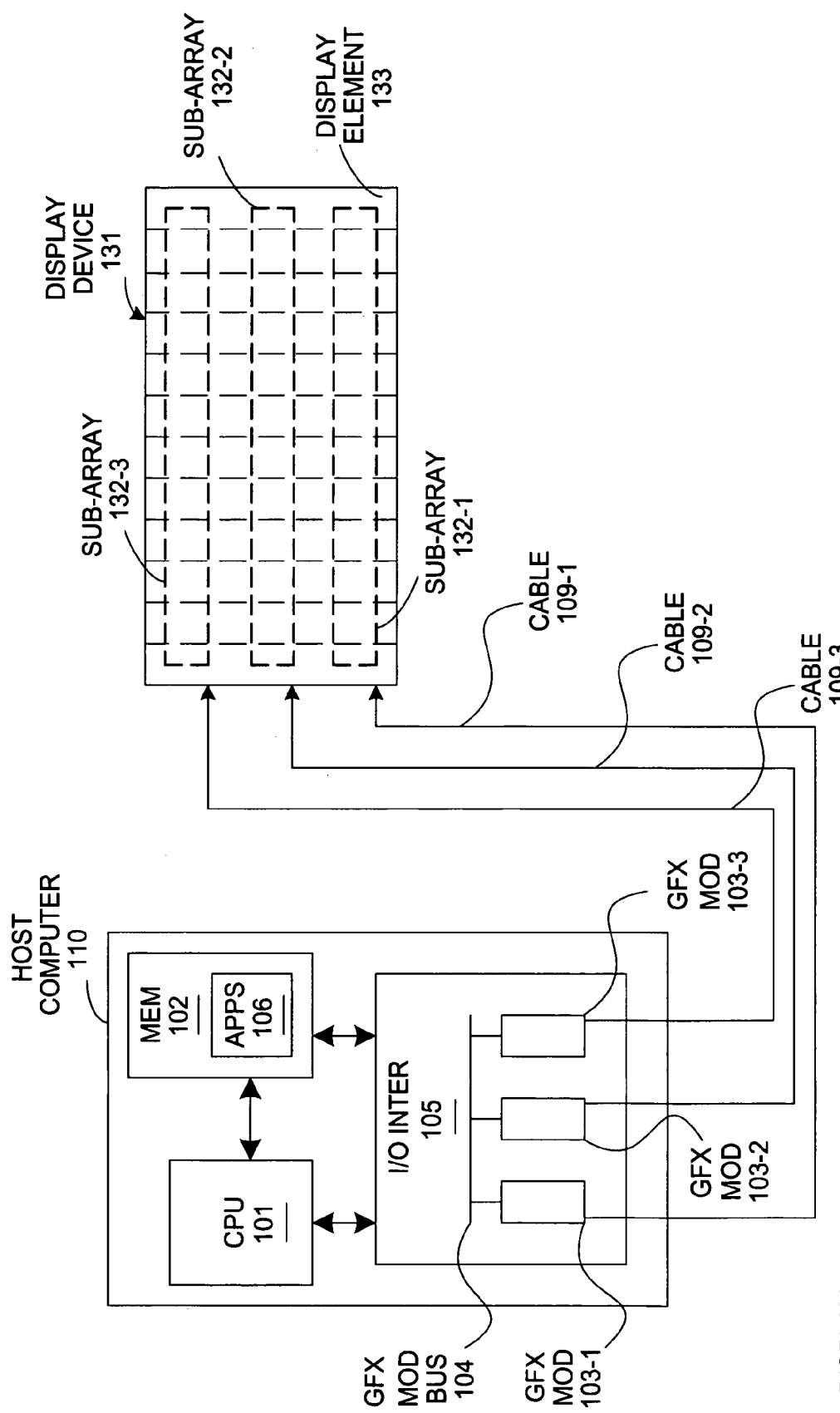
FIG. 1C is a block diagram depicting an exemplary embodiment of a display system having a single host computer with multiple graphics modules for a display device.

FIG. 1C is a block diagram depicting a display system 130 having a single host computer 110 with multiple graphics modules 103-1, 103-2 and 103-3 for a display device 131 in accordance with one embodiment of the invention. Graphics modules 103-1, 103-2 and 103-3 are respectively coupled via cables 109-1, 109-2 and 109-3 to sub-arrays 132-1, 132-2 and 132-3 for displaying an image. Of course, cables 109 may be formed into a single cable with multiple leads. As display system 130 is similar to projection system 100 of FIG. 1A, redundant description is not repeated.

The display device 131 is divided into an array of display elements 133 for forming a synchronized image on display device 131. That is, each display element is configured to display a portion of the image (i.e., image element) so that the combined image elements displayed by every display element appear to be synchronized from the viewer's perspective. The term "array" generally refers to any two or more spaced-apart devices or elements, whether or not such spacing is done with or without a regular or irregular interval.

Display elements 133 may be LCDs, CRTs, plasma displays, direct view devices, integrated circuit display devices and the like. Display elements 133 may be grouped into display element sub-arrays 132-1, 132-2 and 132-3. Though three sub-arrays are shown, fewer or more sub-arrays may be used, as fewer or more graphics modules 103 may be used. For instance, one graphics module 103 may be configured to generate a synchronized image for one or more display elements. Furthermore, though complete rows of display elements 133 are grouped into sub-arrays, it should be understood that complete columns of display elements 133 may be grouped into sub-arrays.

Though display elements 133 do not have overlapping projection areas, they may tend to have intensity roll-off. Intensity roll-off is conventionally along edge bands of display elements. In accordance with one embodiment of the invention, graphics modules 103 may be used to adjust the intensity roll-off for each display element 133, as discussed in detail in commonly assigned U.S. patent application Ser. No. 10/625,812, entitled "PER-PIXEL OUTPUT LUMINOSITY COMPENSATION", filed Jul. 22, 2003, issued as U.S. Pat. No. 7,336,277.

Figure 1D:
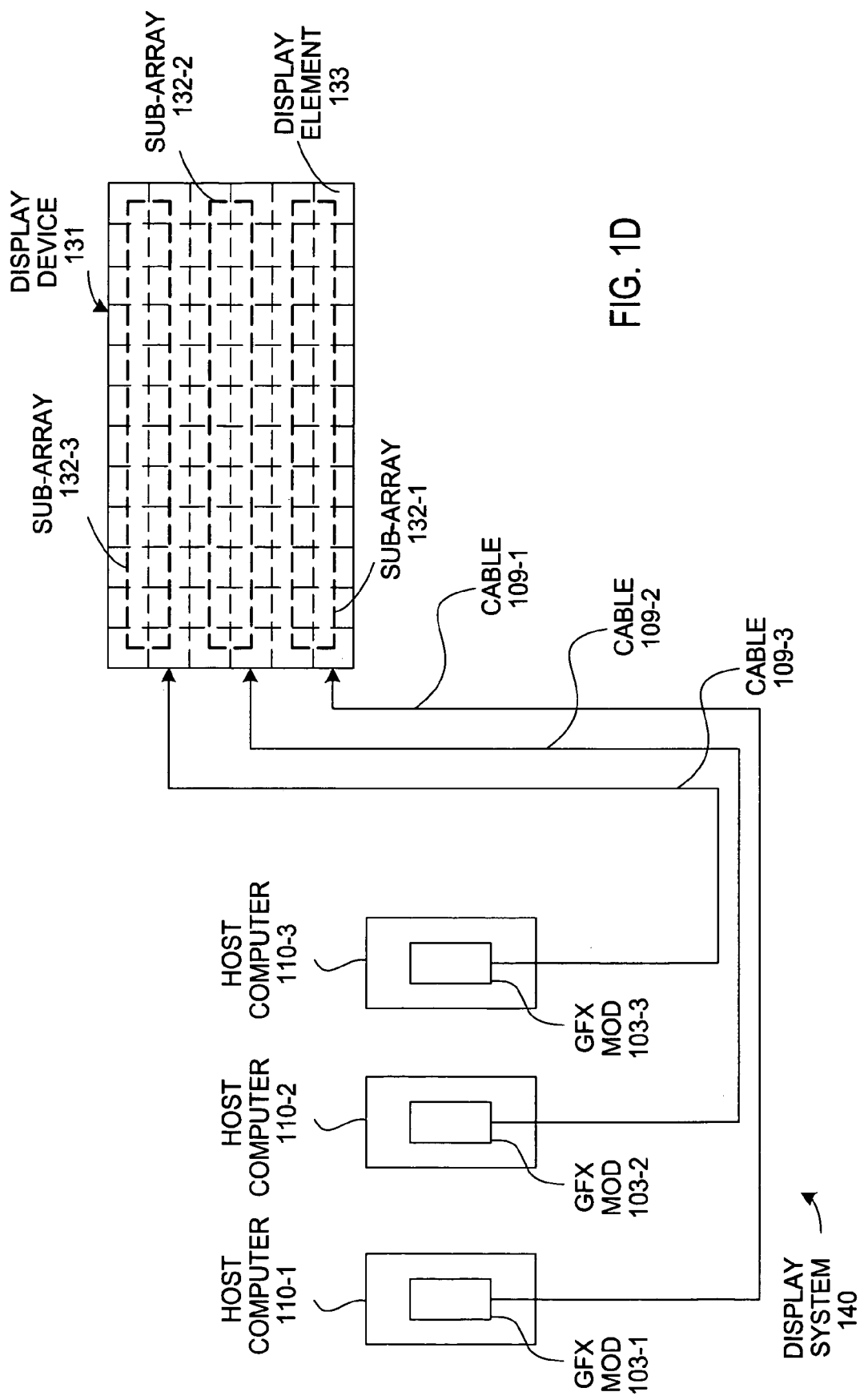
FIG. 1D is a block diagram depicting an exemplary embodiment of a display system having multiple host computers with respective multiple graphics modules coupled to a display device.

FIG. 1D is a block diagram depicting a display system 140 having multiple host computers 110-1, 110-2, 110-3 with respective multiple graphics modules 103 coupled to a display device 131 in accordance with one embodiment of the invention. Display system 140 is similar to display system 130 of FIG. 1C, except that multiple host computers 110-1, 110-2, 110-3 are used, as previously described with respect to projection system 120 of FIG. 1B.

With reference to FIGS. 1A, 1B, 1C and 1D, it should be understood that a graphics module, such as graphics module 103-1, may be a primary control (or master) device, and one or more other graphics modules, such as graphics modules 103-2, 103-3, may be dependent control (or slave) devices. As such, a hierarchy among graphics modules exists and is explained below with additional detail. Notably, graphics modules 103 may be a single GPU or part of a host printed circuit board ("motherboard") or printed circuit boards ("daughter cards") coupled to a motherboard via a bus socket.

As previously mentioned and will be made more clear in the following paragraphs, each graphics module 103 in connection with its respective projector or display element is configured to display a portion of an image such that the combined portions synchronously form the image. In this manner, the graphics modules may be configured to display a super high resolution image on various media, such as a big screen projection television, a wall size display device comprised of multiple display elements, or a game console screen.

FIG. 2A is a block diagram depicting an exemplary embodiment of input and output connections though a daughter card bracket 200 of a graphics module 103 shown in FIGS. 1A, 1B and 1C. The input ports include synchronization input/output ports 201, 202 and external synchronous ("sync") input port 222. The output ports include synchronization input/output ports 201, 202. The synchronization input/output ports 201 and 202 include respective sets of light emitting diodes ("LEDs") 204 and 205. The external sync input port 222 includes an associated sync LED 206. LEDs 204, 205 and 206 are used as indicators for functionality and connectivity of their respective associated ports.

FIG. 2B is a block diagram depicting an exemplary embodiment of connectivity of input and output ports of FIG. 2A as applied to a multiple host computer system, where graphics module 103-1 is primary and graphics modules 103-2 and 103-3 are dependent on graphics module 103-1. In this respect, graphics modules 103 are connected in series, in what is sometimes referred to as a "daisy chain."

An external sync signal 207 may optionally be applied to external sync input port 222 for obtaining a signal to which graphics control modules 103 are timed for projection or display of respective image elements. Synchronization input/output port 202 of graphics module 103-1 is coupled via cable 221-1 to synchronization input/output port 201 of graphics module 103-2, and synchronization input/output port 202 of graphics module 103-2 is coupled via cable 221-2 to synchronization input/output port 201 of graphics module 103-3.

Figure 2C:
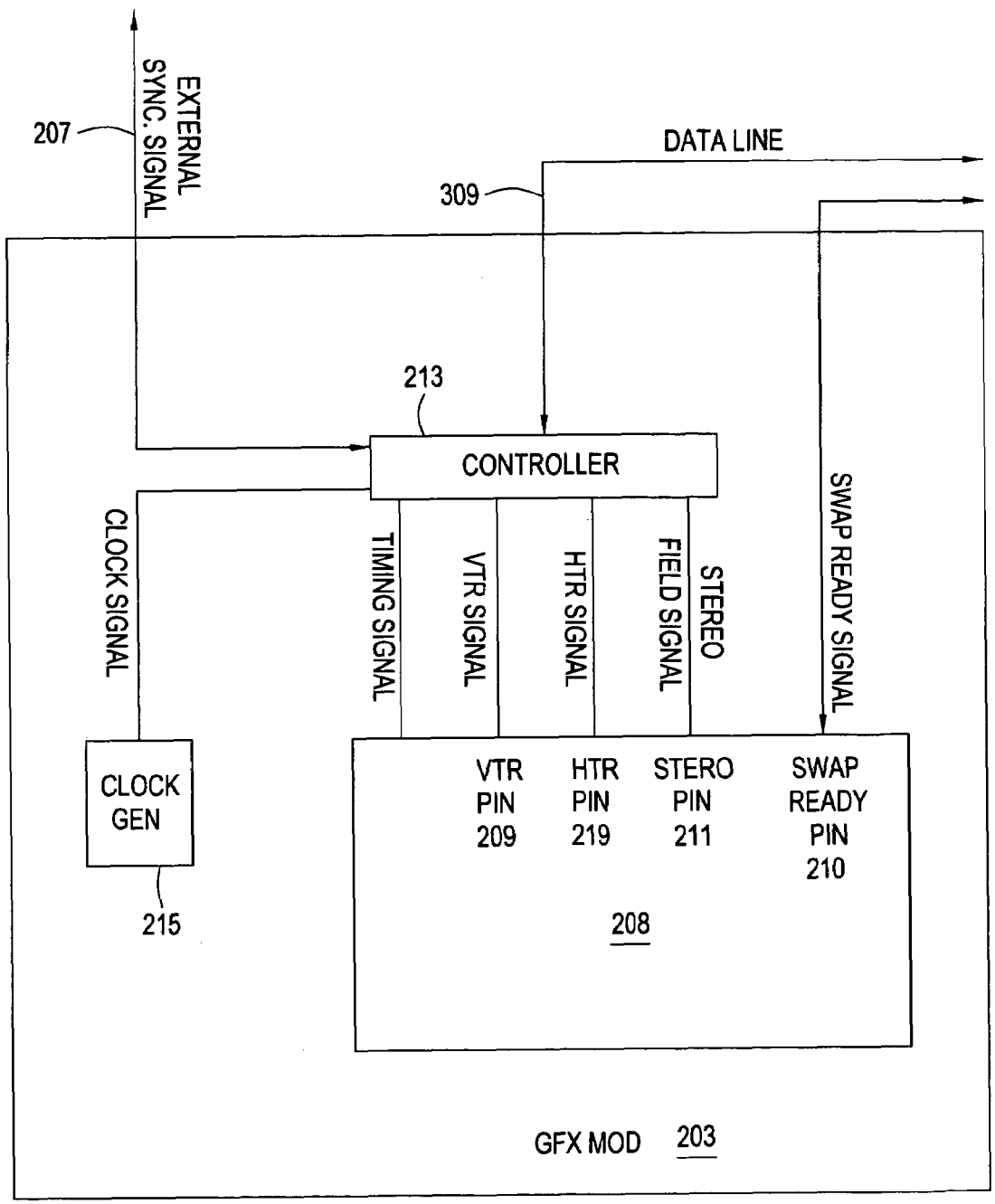
FIG. 2C is a block diagram illustrating a graphics module in accordance with one embodiment of the invention.

FIG. 2C is a block diagram illustrating a graphics module 203 in accordance with one embodiment of the invention. The graphics module 203 includes a clock generator 215, a controller 213 and a GPU 208. The GPU 208 includes a swap ready pin 210 through which swap ready signals are communicated.

The clock generator 215 is configured to provide a clock signal to the controller 213, which is configured to compare the clock signal with an external synchronization signal 207 and adjust the frequency of the clock generator 215 to the frequency of the external synchronization signal 207 if the clock signal and the external synchronization signal 207 are not in phase. Synchronization of the clock signal with the external synchronization signal 207 will be described in more detail with reference to FIGS. 4E and 4F. In one embodiment, the clock generator 215 may be integrated into the GPU 208. The controller 213 is also configured to provide a timing signal to the GPU 208, the timing signal being the synchronized clock signal and the external synchronization signal 207. In one embodiment, the external synchronization signal 207 may not be present. In such an embodiment, the timing signal is the same as clock signal.

The controller 213 is further configured to provide a vertical timing reset signal and a horizontal timing reset signal to the GPU 208 via a VTR pin 209 or an HTR pin 219, respectively. The controller 213 is further configured to provide a stereo field signal to the GPU 208 via a stereo pin 211. The controller 213 is further configured to transmit various signals, such as the timing signal, the stereo field signal and a frame count, through a controller data line 309 to another graphics module, which has the same components as graphics module 203. In one embodiment, the controller 213 may be integrated into the GPU 208. In such an embodiment, the external synchronization signal 207 may be directly connected to the GPU 208.

Figure 2D:
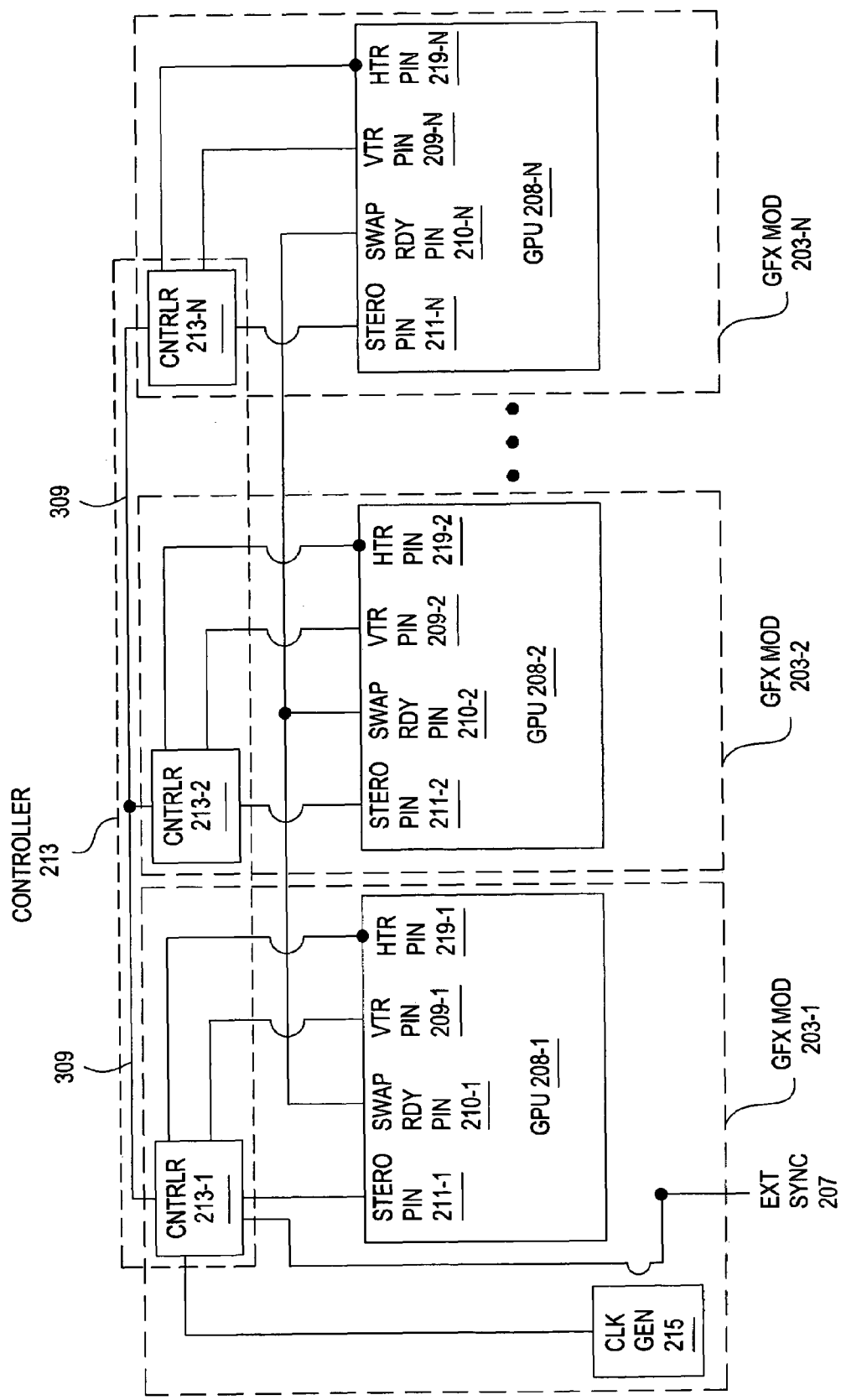
FIG. 2D illustrates a number of graphics modules connected in series in accordance with one embodiment of the invention.
Figure 2E:
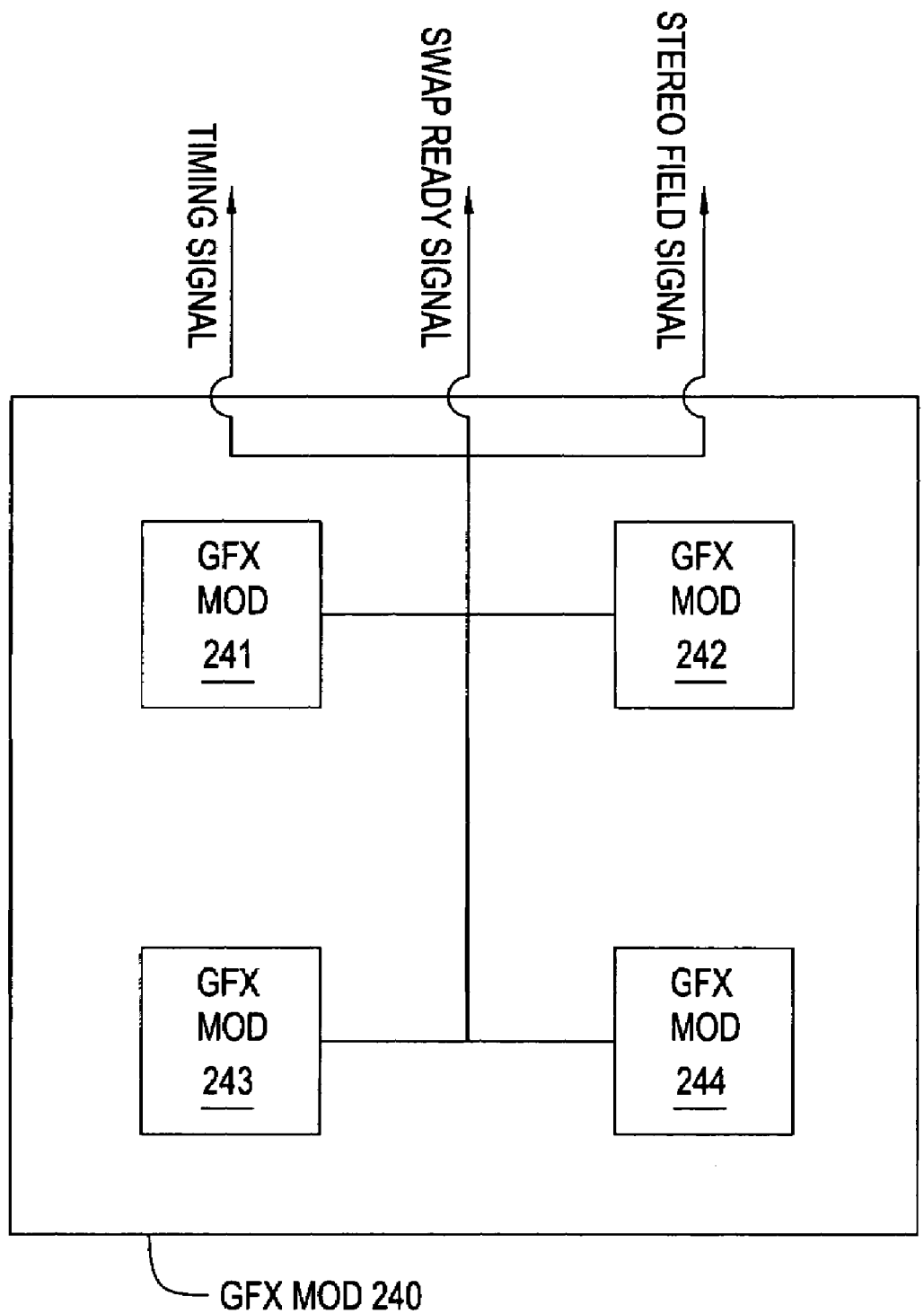
FIG. 2E illustrates graphics module in accordance with one embodiment of the invention.

As such, graphics module 203 may easily be replicated and be scaled up or down as desired. For instance, FIG. 2D illustrates a number of graphics modules, i.e., 203-1, 203-2 . . . 203-N, connected in series in accordance with one embodiment of the invention. Graphics module 203-1 is configured to perform as the primary graphics module. As such, graphics module 203-1 is configured to provide a timing signal to graphics modules 203-2 . . . 203-N. FIG. 2E illustrates graphics module 240 in accordance with one embodiment of the invention. Graphics module 240 includes graphics module 241, 242, 243 and 244, all of which are connected to each other and have the same components as described above. Graphics module 240 may be configured to provide a timing signal, a stereo field signal and a swap ready signal to another graphics module having the same structure as graphics module 240.

As described in further detail below in connection with FIGS. 3, 5A and 5B, swap ready pin 210-1, 210-2 and 210-N of GPU's 208-1, 208-2 and 208-N, respectively, are used to communicate among such GPU's 208 when an image content stored in a back portion of a frame buffer of a respective GPU 208 is ready to be transferred to a front portion of a frame buffer of such GPU. Each GPU 208 could sense the voltage at its respective swap ready pin 210. In one embodiment, each GPU 208 may pull down the voltage on its swap ready pin 210 below a predetermined threshold value, i.e., drive the voltage to a logical LOW voltage, when ready to transfer image content. If the voltage sensed on the swap ready pin 210 by any GPU 208 is above the threshold value, each GPU 208 would be informed that at least one other GPU was not ready to transfer image content from a back portion to a front portion of a frame buffer. Thus, no transfer of such image content would be done until all GPU's 208 were ready to make such a transfer, namely, when each GPU 208 sensed the voltage on swap ready pin was below the threshold value. When one GPU pulls down a voltage on its swap ready pin 210, the voltage of each swap ready pin 210 on the other GPU's are also pulled down. In another embodiment, each GPU 208 may push up (release) the voltage on its swap ready pin 210 above a predetermined threshold value, i.e., drive the voltage to a logical HIGH voltage, when ready to transfer image content. When one GPU 208 releases the voltage on its swap ready pin 210, the voltage on the swap ready pin 210 of the other GPU's are also released. This coordination among GPU's 208 using swap ready pins 210 is used to maintain synchronization of image content in a front portion of a frame buffer of each GPU 208.

A controller 213 is coupled to GPU's 208. The controller 213 may be part of a primary (master) graphics module, for example, graphics module 203-1. Alternatively, each graphics module 203 may include a respective controller 213.

Controllers 213 may be state machines instantiated in logic. Signals from stereo pins 211 are for coordination of frame display, for example, a left or a right frame. Controllers 213 are used to coordinate among GPU's 208 for display virtual imagery, such as a three-dimensional image displayed or projected in a virtual reality simulator. Passive or active stereo may be used. Passive stereo is conventionally understood to mean that both left and right frames are displayed at the same time, and this is conventionally done with a scan-out rate at least approximately equal to the frame rate. Active stereo is conventionally understood to mean that left and right frames are alternatively displayed, and this is conventionally done at a frame rate that is at least approximately one-half of the scan-out rate.

Figure 3:
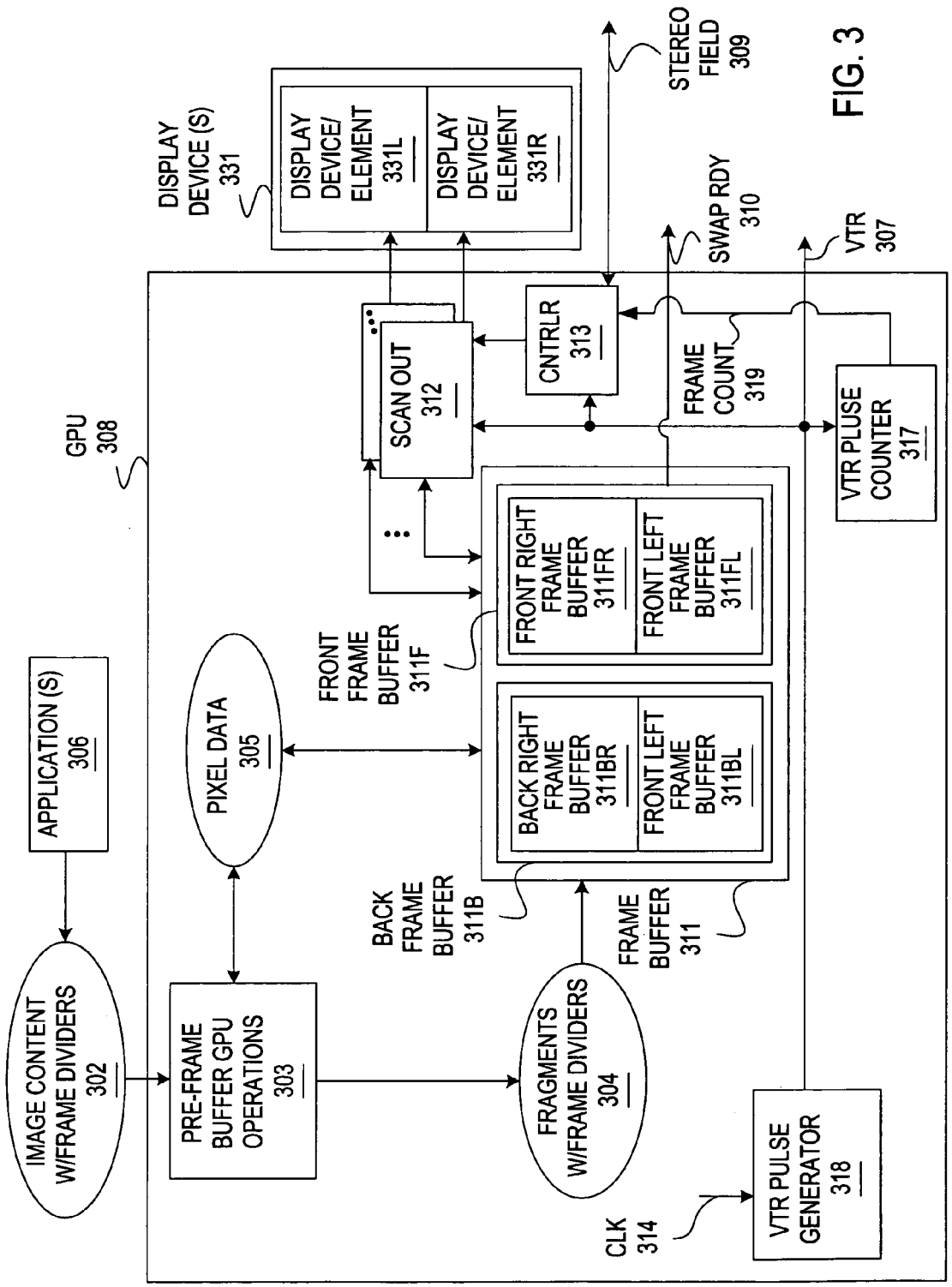
FIG. 3 is a high-level block diagram depicting an exemplary embodiment of a graphics processing unit.

FIG. 3 is a high-level block diagram of a GPU 308 in accordance with one embodiment of the invention. Image content, including frame dividers, 302 is obtained from one or more applications 306. One or more well-known pre-frame buffer GPU operations 303 are applied to content 302. Output from pre-frame buffer GPU operations 303 includes fragments, with frame dividers, 304 and pixel data 305, both of which are sent to a back portion 311B or a front portion 311F of frame buffer 311 for temporary storage. As FIG. 3 also shows, image content stored in frame buffer 311 may be provided back as pixel data 305 for further processing with pre-frame buffer GPU operations 303. More particularly, such pixel data 305 fed back for pre-frame buffer GPU operations 303 may be obtained from a back portion 311B of frame buffer 311 or a front portion 311F of frame buffer 311. As will be described in the following paragraphs, image content is scanned out from the front portion 311F.

Many conventional details with respect to GPU 308 are omitted for purposes of clarity. Furthermore, frame buffering may be performed by various memory configurations. For instance, memory 102 of a host computer system in FIG. 1A may be used for frame buffering. Alternatively, graphics modules 203 may have external memory for frame buffering, or GPU's 308 may have embedded memory for frame buffering. Any combination of host memory, non-embedded GPU graphics module memory or embedded GPU memory may be used for frame buffering.

The frame buffer 311 is divided into at least two portions, namely, a back portion 311B and a front portion 311F. Additionally, the back portion 311B and the front portion 311F may be divided for right and left frames, for example, for a stereo application 306 or for controlling two projectors or two sets of display elements, where a set includes one or more display elements. Thus, the frame buffer 311 may have a back right frame buffer 311BR, a back left frame buffer 311BL, a front right frame buffer 311FR and a front left frame buffer 311FL.

Coupled to the frame buffer 311, or more particularly, the front portion 311F of the frame buffer 311, is at least one scan out 312. A plurality of scan outs 312 may be coupled to the frame buffer 311. For example, a scan out 312 may be coupled to the front right frame buffer 311FR for displaying an image on a right display element 331R, and another scan out 312 may be coupled to the front left frame buffer 311FL for displaying an image on a left display element 331L. Left and right frame buffers may be used for storing left and right frames, respectively, for stereo display. Although display elements and devices are described here, projectors may be used in connection with embodiment of the invention. Furthermore, although a single display device 331 is shown, multiple display devices 331 may be used, as previously described with reference to FIGS. 1A, 1B, 1C and 1D. However, for clarity, only two scan outs 312 are described for controlling display elements 331L and 331R of a single display device 331.

In addition to conventional elements of GPU 308 described above, GPU 308 includes a VTR pulse generator 318, swap ready signal 310 and VTR signal 307 paths, and optionally, an internal controller 313. As described above, the controller 313 may be external to GPU 308 and may be used for stereo applications. For stereo display, GPU 308 provides a stereo field signal path through the controller data line 309. GPU 308 may also include a VTR pulse counter 317 to keep a frame count output as frame count signal 319, which is configured to identify frame numbers on different GPU's 308. In one embodiment, such a frame count may optionally be exchanged among those different GPU's 308 via the controller data line 309, as described below in additional detail.

A clock signal 314 is provided to the VTR pulse generator 318 to generate VTR signal pulses, which are provided to the scan out 312. Scan out of image content from the frame buffer 311, particularly a front portion 311F of frame buffer 311, is performed in response to the VTR pulses. Thus, a frame, or portion thereof, for active stereo of image content is scanned out in response to a VTR pulse. These VTR pulses may also be used to synchronize the output of different GPU's 308. More specifically, these VTR pulses may be forwarded to the different GPU's 308 via the VTR signal path 307. When image content is stored in a front portion of a frame buffer of each such GPU 308, that image content may be scanned out simultaneously from the respective front portion 311F in response to the VTR pulses.

A swap ready signal 310 is provided from the frame buffer 311 in response to a completed transfer or soon to be completed transfer, such as a prefetch response, of image content from a back portion 311B to a front portion 311F of the frame buffer 311.

For a stereo application, the VTR signal 307 is provided to the controller 313. In one embodiment, the controller 313 is a state machine that operates partially in response to frame count increments, and thus partially in response to VTR pulses. Optionally, as mentioned above, the VTR signal 307 may be provided to the VTR pulse counter 317 for counting VTR pulses to keep a frame count, which may be provided as frame count signal 319 for synchronizing frames with dependent GPU's 308 via the controller data line 309. As such, dependent GPU's 308 need not have a VTR pulse counter.

The controller 313 is coupled to the scan out 312 to indicate whether a right or a left frame is to be displayed for active stereo. For passive stereo, both left and right frames are displayed together, thus separate scan outs 312, one for left frames and one for right frames, can operate in response to the same VTR pulses of VTR signal 307. The controller 313 may provide information, such as reset, to the scan out 312. Additionally, the controller 313 may provide the stereo field signal through the controller data line 309 to communicate stereo state information among different GPU's 308.

Figure 4A:
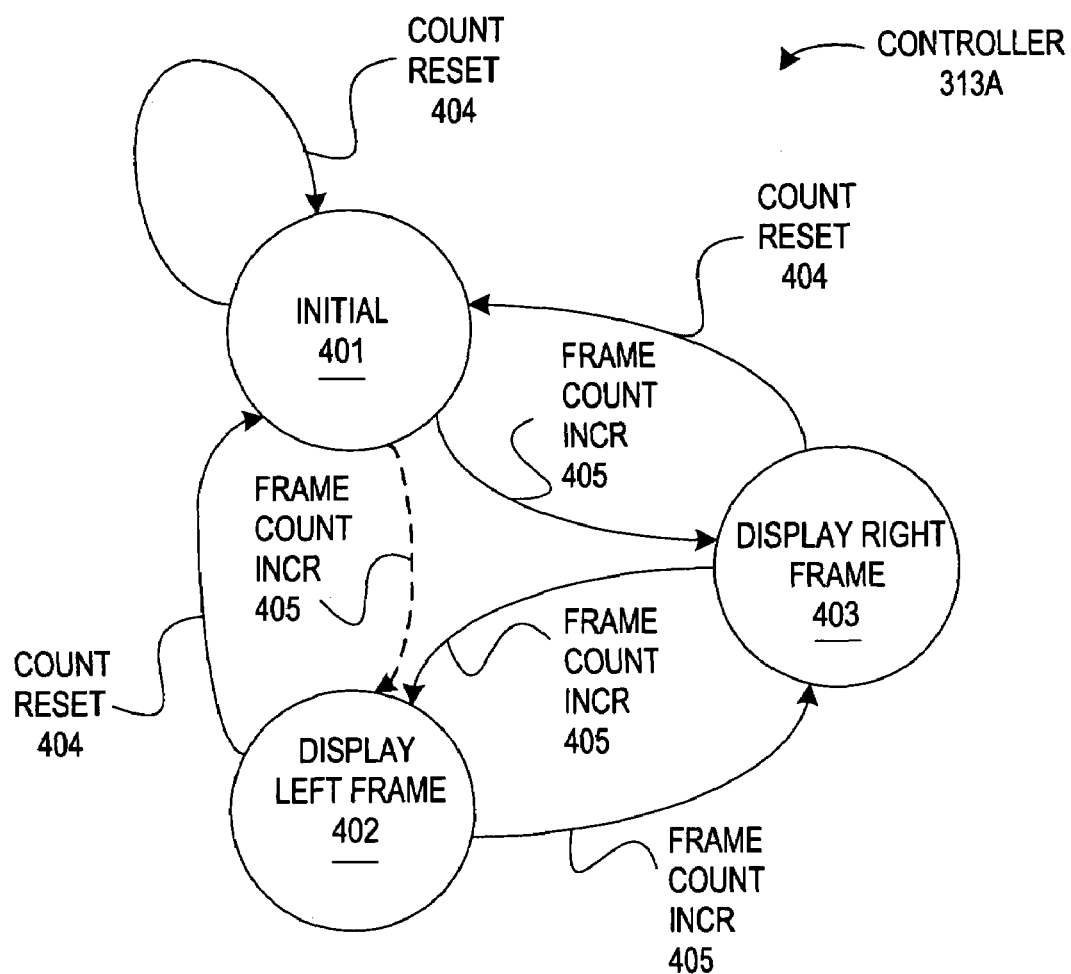
FIG. 4A is a state diagram depicting an exemplary embodiment of a state machine controller for active stereo.

FIG. 4A is a state diagram for a controller 313A for active stereo in accordance with one embodiment of the invention. The controller 313A starts off in an initial state 401. A frame count reset event 404 will keep the controller 313A in this initial state. A frame count increment event 405, in response to a VTR pulse or a frame count signal, depending on the configuration of dependent GPU's 308, will cause the controller 313A to transition from the initial state 401 to a display state.

For active stereo, a frame count increment event 405 causes the controller 313A to transition from the initial state 401 to either a display left frame state 402 or a display right frame state 403. Assuming, that all first frames start with displaying of a right frame, then the controller 313A transitions into the display right frame state 403. From the display right frame state 403, for each frame count increment event 405, the controller 313A transitions to the display left frame state 402. From the display left frame state 402, for each frame count increment event 405, the controller 313A transitions to the display right frame state 403. If a frame count reset event 404 occurs while in either the display left frame state 402 or the display right frame state 403, then the controller 313A transitions to the initial state 401.

Figure 4B:
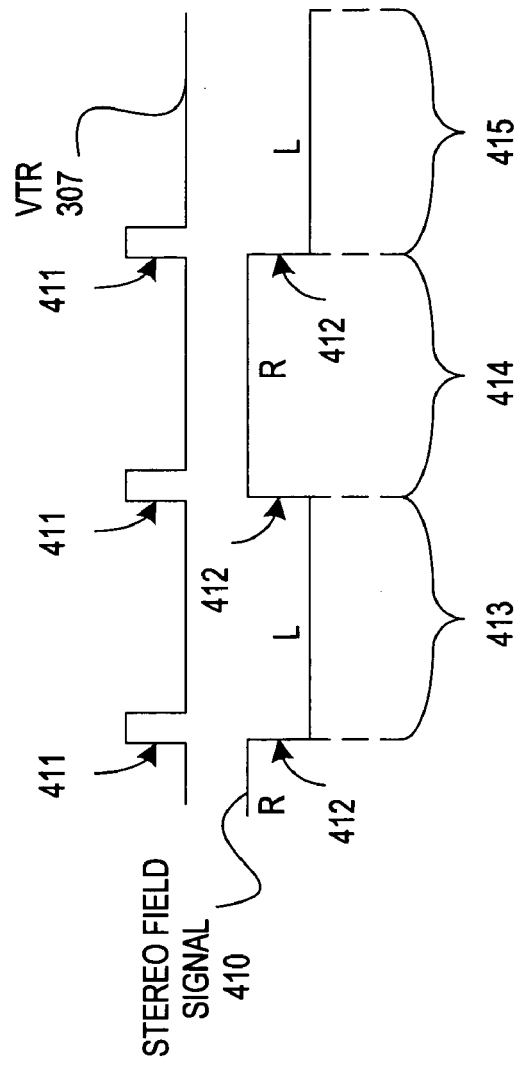
FIG. 4B is a timing diagram depicting an exemplary embodiment of control signals for active stereo display.

FIG. 4B is a timing diagram depicting an exemplary embodiment of control signals for active stereo display. VTR signal 307 is used to provide VTR pulses 411. Responsive to each VTR pulse 411, the stereo field signal 410 changes state. If a left frame is being displayed during the time interval 413, when the next VTR pulse 411 is received, the stereo field signal 410 transitions 412, from low to high for example, and a right frame is displayed during the next time interval 414. Likewise, if a right frame is being displayed during the time interval 414, when a next VTR pulse 411 is received, the stereo field signal 410 transitions 412, from high to low for example, and a left frame is displayed during the next time interval 415. In this embodiment, the frame rate is generally one-half the scan-out rate.

Figure 4D:
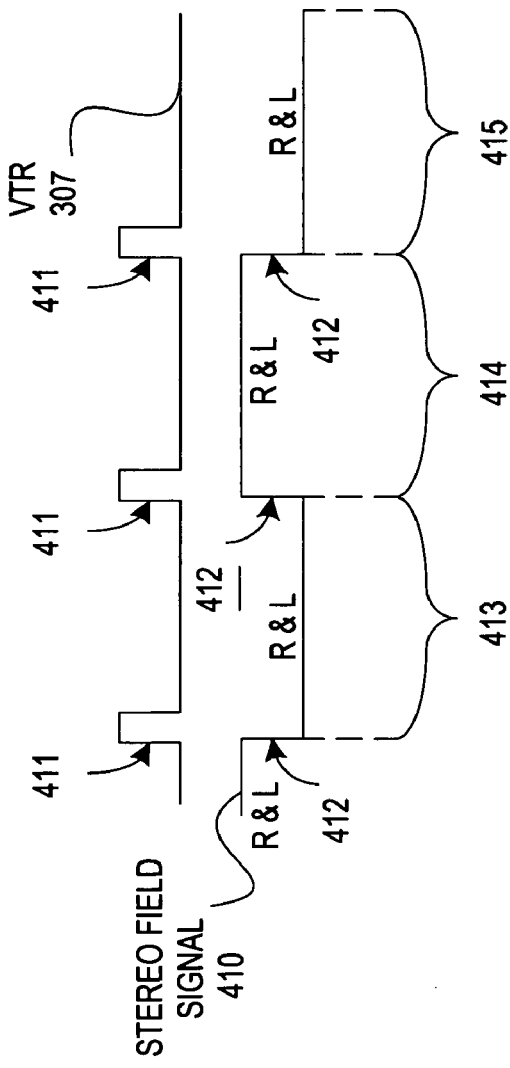
FIG. 4D is a timing diagram depicting an exemplary embodiment of control signals for passive stereo display.
Figure 4C:
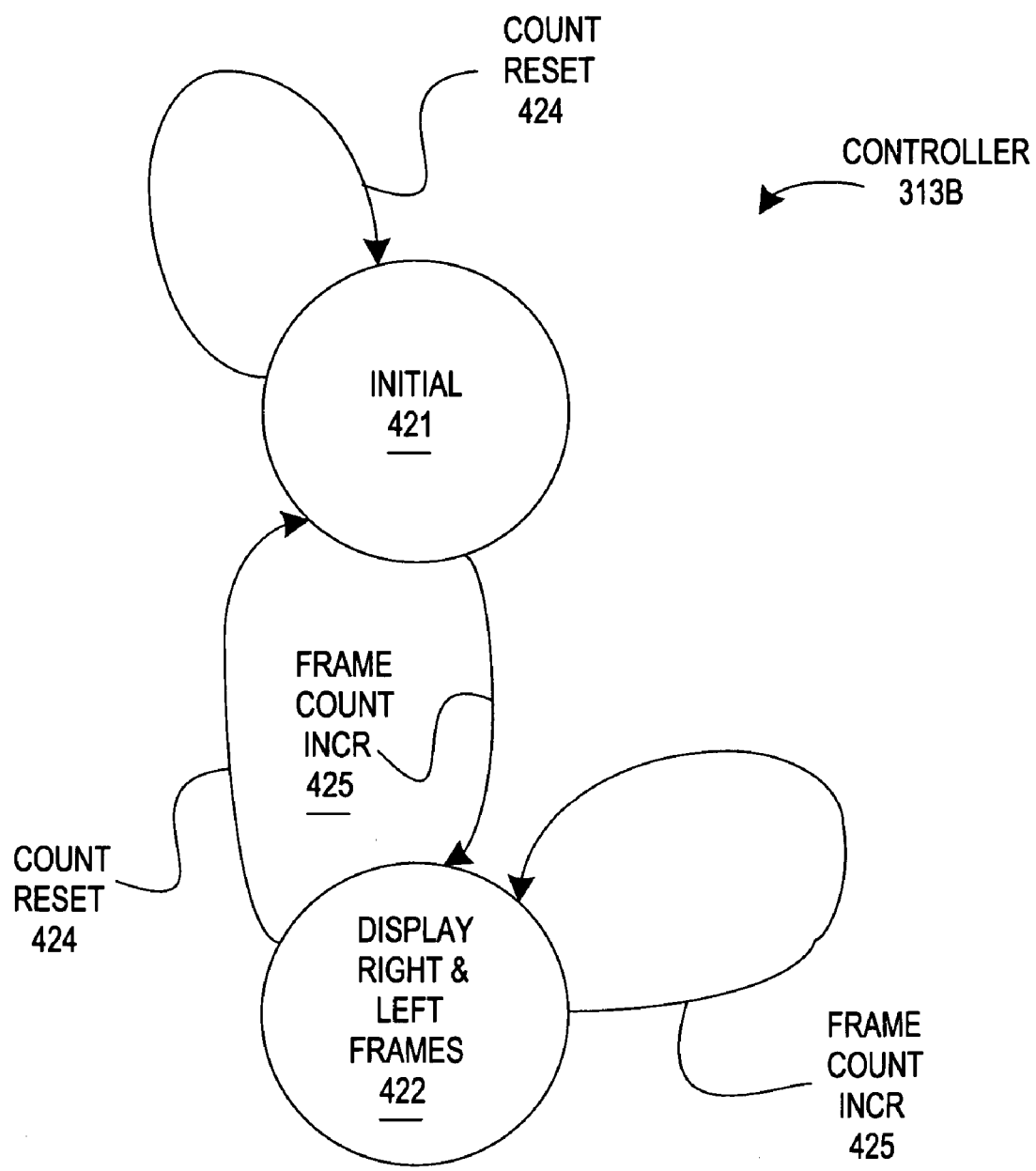
FIG. 4C is a state diagram depicting an exemplary embodiment of a state machine controller for passive stereo.

FIG. 4C is a state diagram for a controller 313B for passive stereo in accordance with one embodiment of the invention. Notably, both controllers 313A of FIG. 4A and 313B may be used by a single GPU 308, whether external or internal to such a GPU 308, where selection as between active or passive stereo is performed by a stereo application 306.

The controller 313B starts off in an initial state 421. A frame count reset event 424 will keep the controller 313B in this initial state, and a frame count increment event 425, responsive to a VTR pulse or a stereo field signal depending on configuration of dependent GPU's 308, as mentioned above, will cause controller 313B to transition from the initial state 421 to display right and left frames state 422.

From display right and left frames state 422, for each frame count increment event 425, the controller 313B stays in display right and left frames state 422 to display a next set of right and left frames. If a frame count reset event 424 occurs while in display right and left frame state 422, then the controller 313B transitions to the initial state 421.

FIG. 4D is a timing diagram depicting an exemplary embodiment of control signals for passive stereo display. VTR signal 307 is used to provide VTR pulses 411. Responsive to each VTR pulse 411, the stereo field signal 410 changes state. If a right and left frame are being displayed during the time interval 413, when a next VTR pulse 411 is received, the stereo field signal 410 transitions 412, from low to high for example, and a next right and left frame are displayed during the next time interval 414. Likewise, if a right and left frame are being displayed during the time interval 414, when a next VTR pulse 411 is received, the stereo field signal 410 transitions 412, from high to low for example, and a next right and left frame are displayed during the next time interval 415. In this embodiment, the scan-out rate and frame rate are equivalent.

In this manner, the stereo field signal 410 in FIG. 4 may be used to provide information on stereo mode (active or passive) and current state of the controller 313. Additionally, the stereo field signal 410 may be used to separately count left and right frames by incrementing separate counters on alternate VTR pulses for active stereo.

Although only left and right fields have been described, more than two fields or image elements may be generated for forming a three-dimensional effect. Accordingly, any number (N) of fields may be used to generate a three-dimensional effect for an image, where N is an integer greater than or equal to two.

Figure 4E:
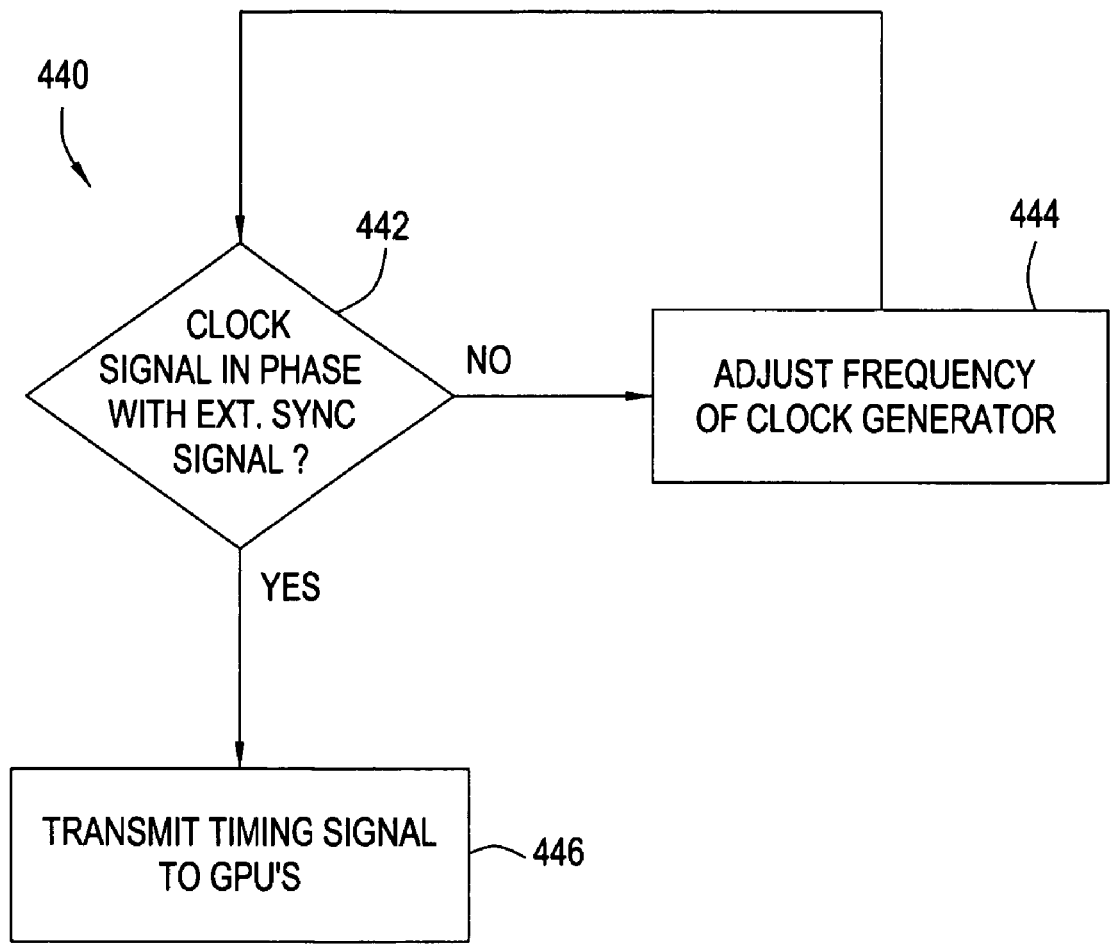
FIG. 4E is a flow diagram depicting a method for synchronizing the clock signal from the clock generator in accordance with one embodiment of the invention.

FIG. 4E is a flow diagram depicting a method 440 for synchronizing the clock signal from the clock generator 215 in accordance with one embodiment of the invention. Method 400 is generally performed by a master or primary graphics module, e.g., 203-1. At step 442, the controller, e.g., 213-1, compares the phase of the clock signal with the phase of the external synchronization signal 207. If the phase of the clock signal is not in synchronization with the phase of the external synchronization signal 207, then the frequency of clock generator 215 is adjusted to match the frequency of the external synchronization signal 207 (step 444). If the phase of the clock signal is in synchronization with the phase of the external synchronization signal 207, then controller 213 transmits the synchronized signal as the timing signal to its own GPU, e.g., 208-1, and other graphics modules connected thereto, e.g., 203-2 . . . N (step 446). In this manner, the timing signal in each GPU is in synchronization with the external synchronization signal 207.

Figure 4F:
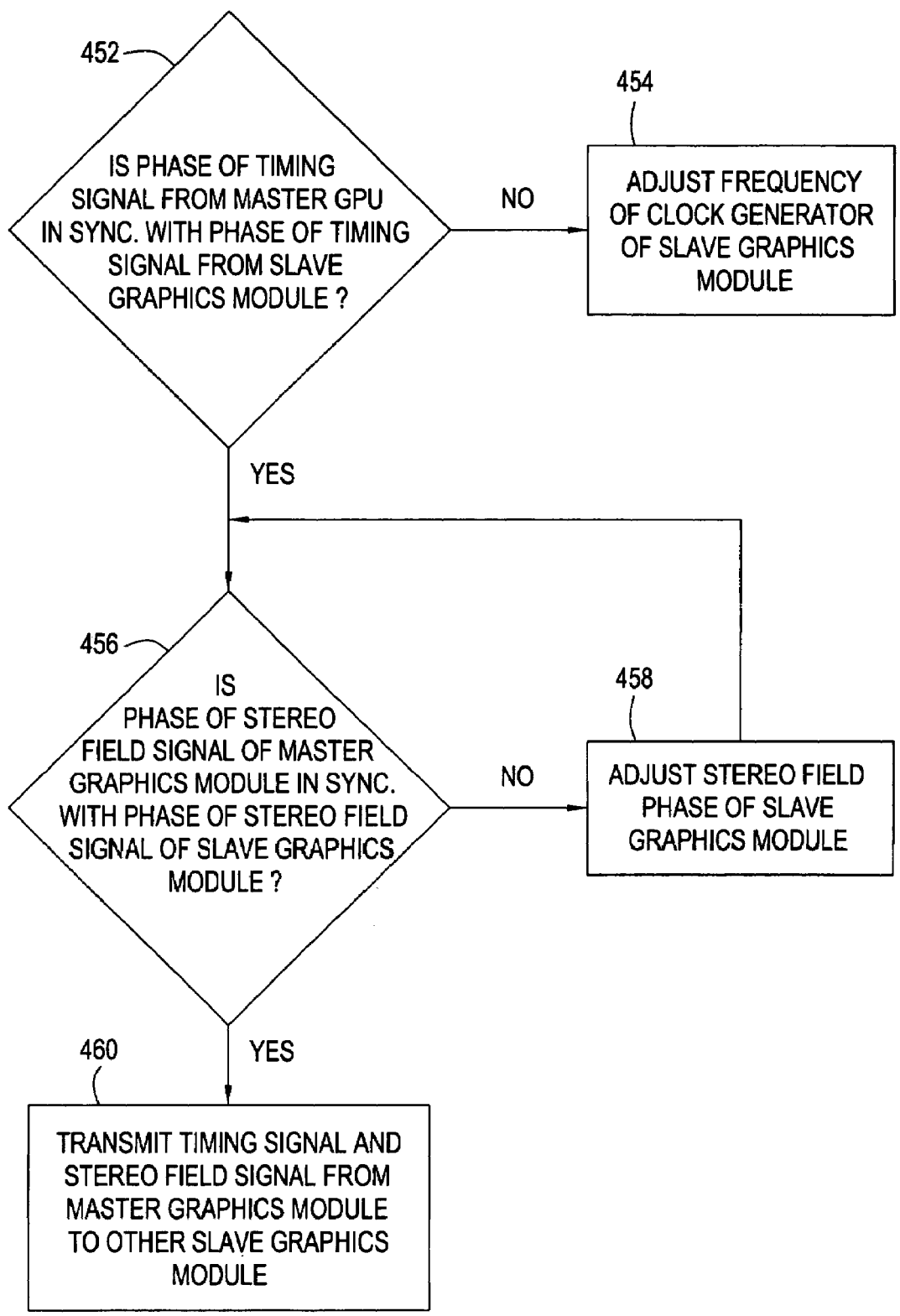
FIG. 4F is a flow diagram depicting a method for synchronizing the primary or master graphics module with the secondary or slave graphics modules in accordance with one embodiment of the invention.

FIG. 4F is a flow diagram depicting a method 450 for synchronizing the primary or master graphics module, e.g., 203-1, with the secondary or slave graphics modules, e.g., 203-2 . . . N, in accordance with one embodiment of the invention. Upon receipt of the timing signal from the controller 213-1, the slave graphics module, e.g., 203-2, compares the phase of the timing signal from the master graphics module, e.g., 203-1, with its own timing signal (step 452). If the phase of the timing signal from the master graphics module is not in synchronization with the phase of its own timing signal, then the frequency of clock generator of the slave graphics module is adjusted to the frequency of the timing signal of the master graphics module (step 454). If the phase of the timing signal from the master graphics module is in synchronization with the phase of its own timing signal, then processing continues to step 456 at which the slave graphics module compares the phase of the stereo field signal from the master graphics module with its own stereo field signal. In one embodiment, the stereo field signal and the timing signal are communicated between the graphics modules through the controller data line 309.

If the phase of the stereo field signal from the master graphics module is not in synchronization with the phase of its own stereo field signal, then the phase of the stereo field signal at the slave graphics module is adjusted (step 458). If the phase of the stereo field signal from the master graphics module is in synchronization with the phase of its own stereo field signal, then the timing signal and the stereo field signal from the master graphics module are transmitted to other graphics modules connected thereto (step 460). Once the timing signal and stereo field signal of each slave GPU are synchronized with the timing signal and the stereo field signal of the master GPU, the GPU's display the pixel data according to the processes described with reference to FIGS. 5A and 5B.

Figure 5A:
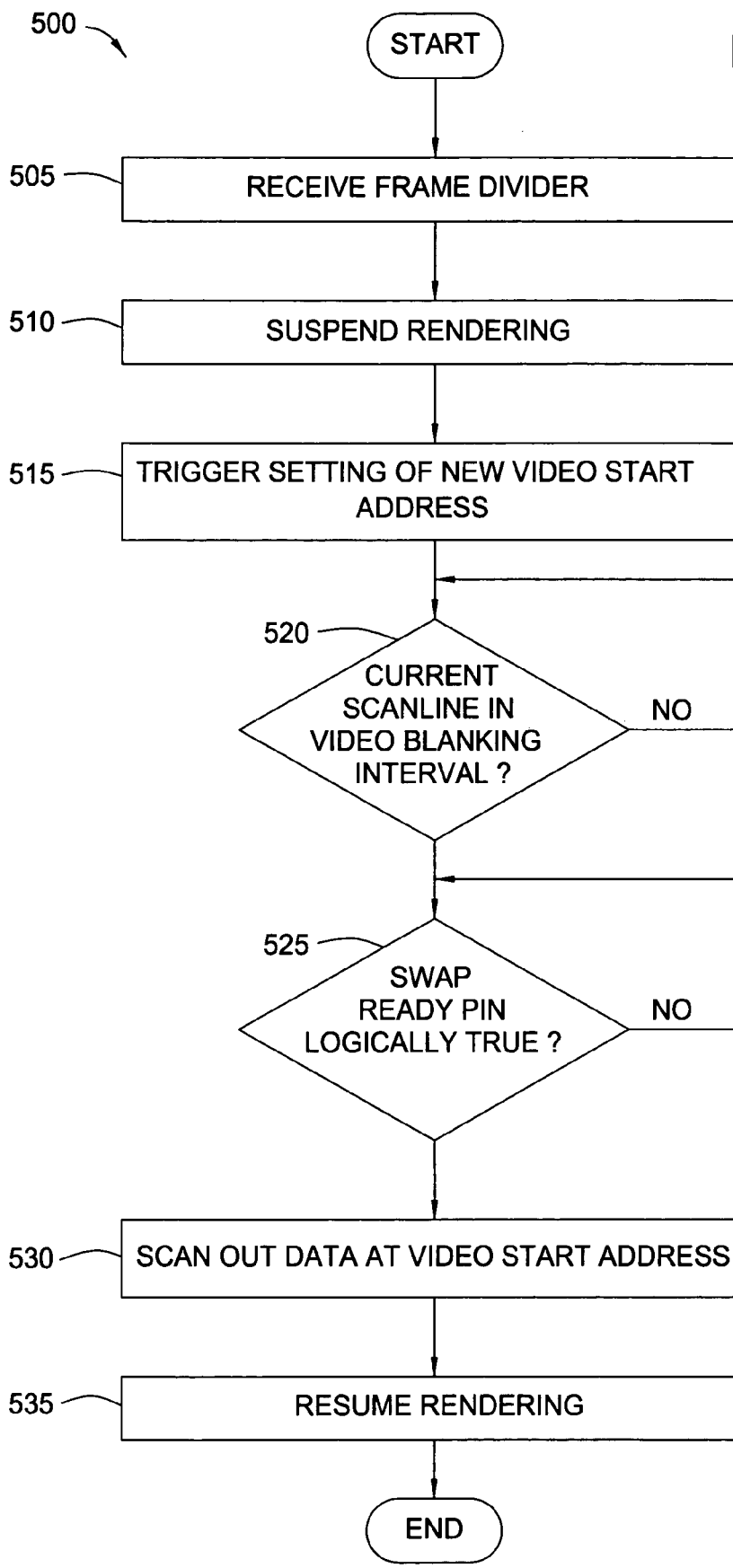
FIG. 5A is a flow diagram depicting a method for synchronizing buffer swaps within a plurality of GPU's for each frame in accordance with one embodiment of the invention.

FIG. 5A is a flow diagram depicting a method 500 for synchronizing buffer swaps within a plurality of GPU's for each frame in accordance with one embodiment of the invention. Method 500 is generally performed for a single window. At step 505, the GPU, e.g., GPU 308 at FIG. 3, receives a frame divider. Upon receipt of the frame divider, the GPU 308 suspends rendering (i.e., processing commands from the application 306), at step 510. Then, a new image start address in memory is triggered, at step 515. This new image start address indicates to the scan out 312 (at FIG. 3) the next location in memory to be read by the scan out 312.

At step 520, the GPU 308 determines whether the current scanline is in the image blanking interval, which typically occurs at the end of each frame. If the answer is in the negative, processing returns to the beginning of step 520. If the answer is in the affirmative, the GPU 308 determines whether the swap ready pin is logically true, at step 525. As mentioned above with reference to FIG. 3, the swap ready pin is logically true when an image content stored in the back portion of a frame buffer of the GPU 308 is ready to be transferred to the front portion of the frame buffer of the GPU 308. In one embodiment, the swap ready pin is logically true when the voltage at the swap ready pin is in a logical HIGH state. As such, the voltage on the swap ready pin is released upward when the image content is ready to be transferred. In another embodiment, the swap ready pin is logically true when the voltage at the swap ready pin is in a logical LOW state. As such, the voltage on the swap ready pin is pulled down when the image content is ready to be transferred.

If the answer to the determination at step 525 is negative, processing returns to the beginning of step 525. If the answer is in the affirmative, then the scan out 312 reads the pixel data from memory beginning at the new image start address. At step 535, the GPU 308 resumes rendering.

Figure 5B:
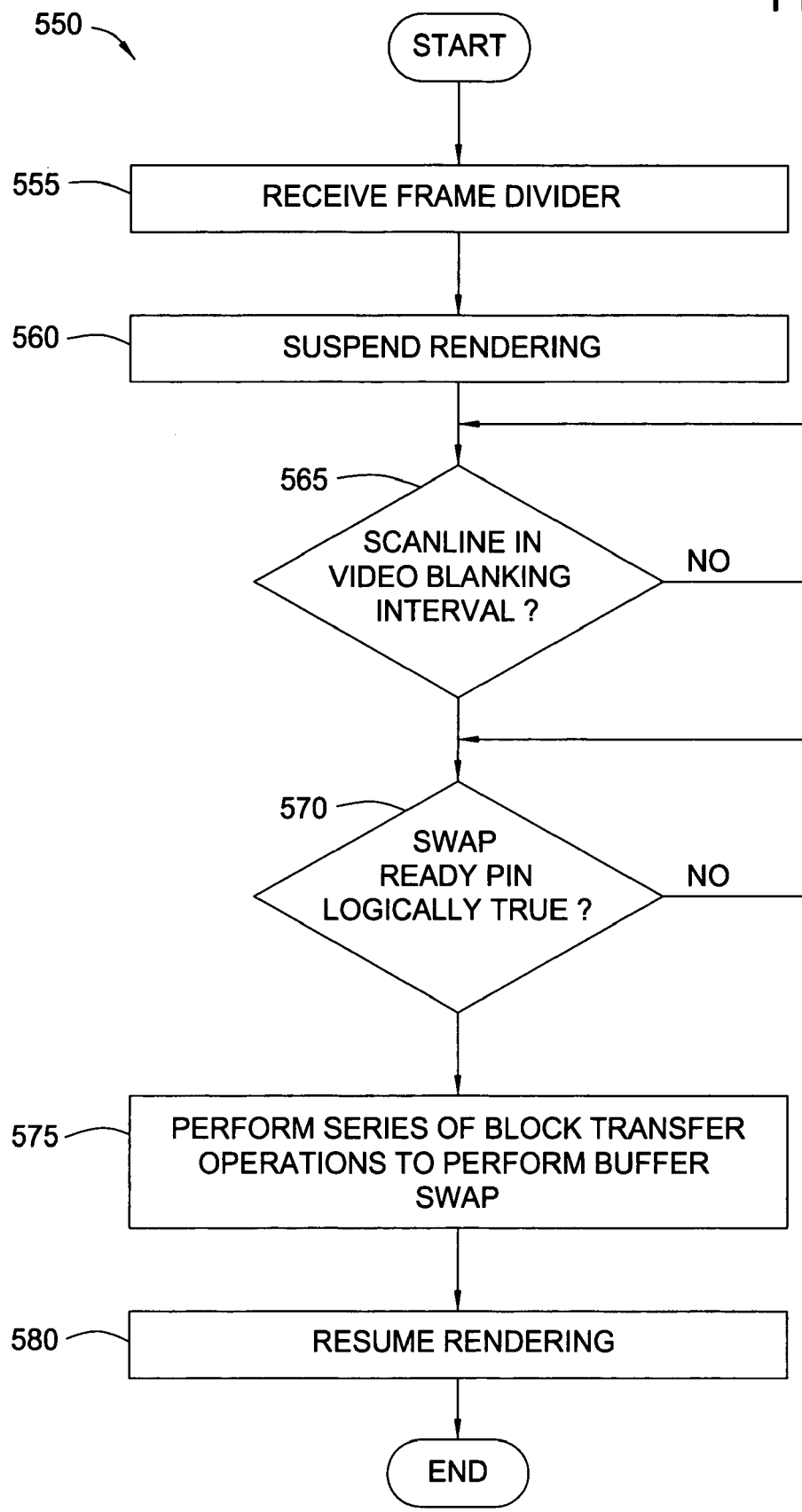
FIG. 5B is a flow diagram depicting a method for synchronizing buffer swaps within a plurality of GPU's for each frame in accordance with another embodiment of the invention.

FIG. 5B is a flow diagram depicting a method 550 for synchronizing buffer swaps within a plurality of GPU's for each frame in accordance with another embodiment of the invention. Method 550 is generally performed for multiple windows. At step 555, the GPU, e.g., GPU 308 at FIG. 3, receives a frame divider. Upon receipt of the frame divider, the GPU 308 suspends rendering (i.e., processing commands from the application 306), at step 560.

At step 565, the GPU 308 determines whether the current scanline is in the image blanking interval, which typically occurs at the end of each frame. If the answer is in the negative, processing returns to the beginning of step 565. If the answer is in the affirmative, the GPU 308 determines whether the swap ready pin is logically true, at step 570. If the answer to the determination at step 570 is negative, processing returns to the beginning of step 570. If the answer is in the affirmative, then the GPU 308 performs a series of image memory block transfers to effectuate the buffer swaps (step 575). At step 580, the GPU resumes rendering.

Figure 6A:
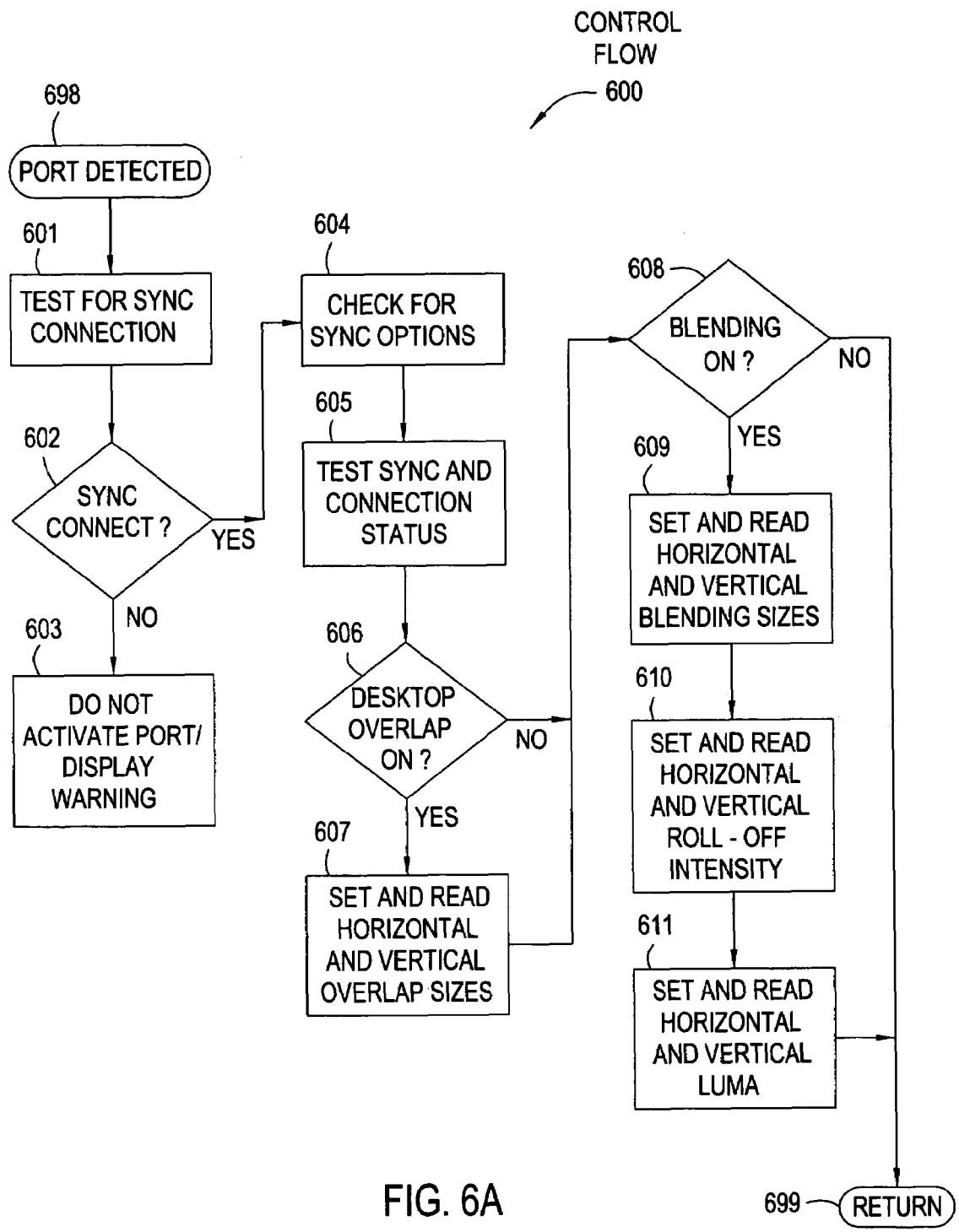
FIG. 6A depicts a flow diagram of a process for testing sync and connection statuses and setting up desktop overlap in accordance with one embodiment of the invention.

FIG. 6A depicts a process 600 for testing sync and connection statuses and setting up desktop overlap in accordance with one embodiment of the invention. At step 698, a connection to a synchronization input/output port is detected. As synchronization input/output ports, such as synchronization input/output ports 201, 202 and external sync input port 222 in FIG. 2A, are similar to Ethernet ports, at step 601 an optional test for a synchronization input/output type of connection is made to reduce or avoid risk of damaging an Ethernet network connection. At step 602, a determination is made as to whether a synchronization input/output connection exists. If the answer is in the negative, then such a synchronization input/output port is not activated for communicating image array control signals and a warning is displayed at 603. On the other hand, if the answer is in the affirmative, then a check for synchronization options is made (at step 604), and synchronization options and connection status are tested, at step 605. Steps 698 through 605 are further described in detail with reference to FIGS. 6C-E.

Figure 6B:
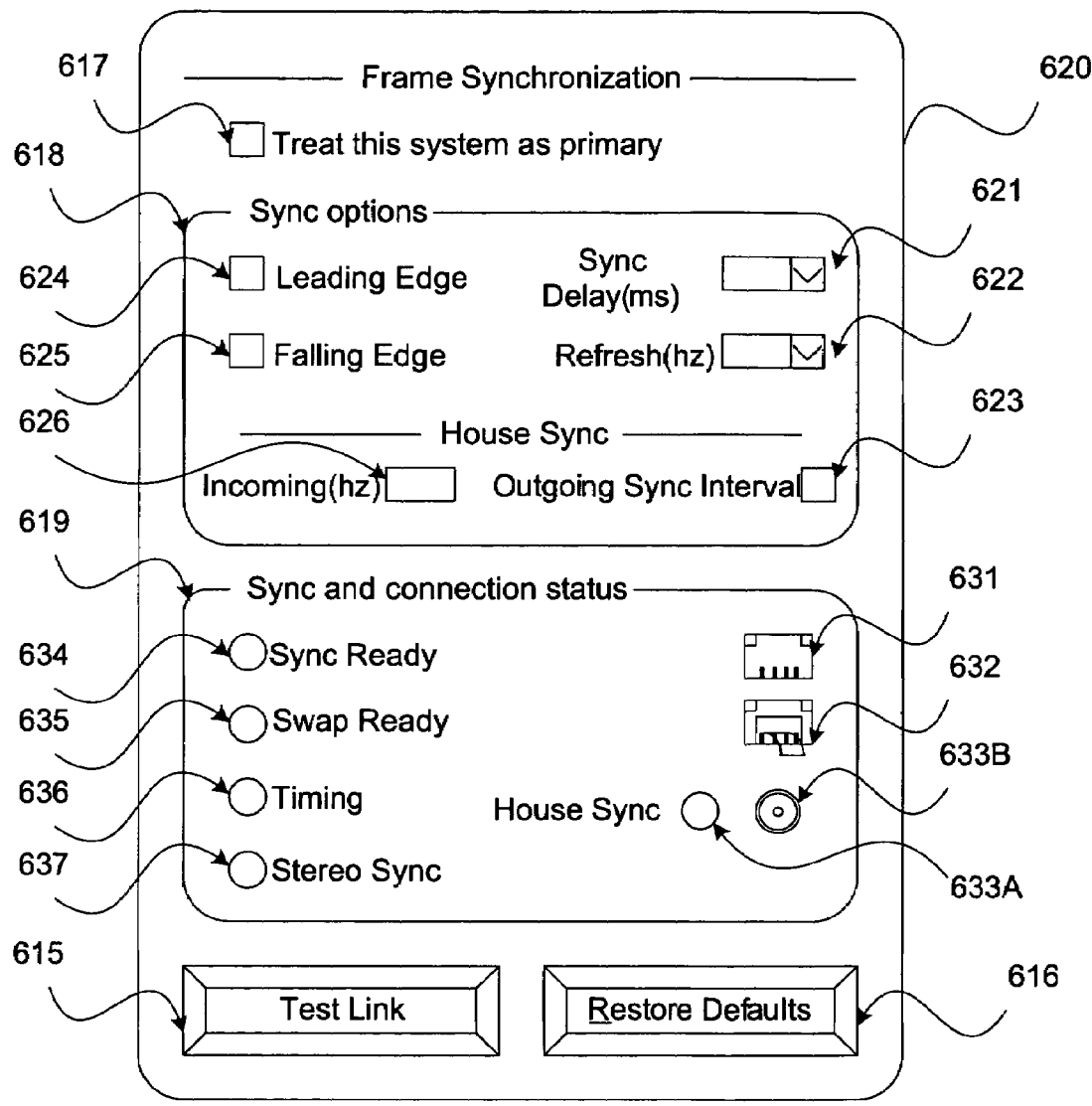
FIG. 6B is a screen view depicting an exemplary embodiment of a graphical user interface ("GUI") for a portion of control flow of FIG. 6A.

FIG. 6B is a screen view depicting an exemplary embodiment of a graphical user interface ("GUI") 620 for a portion of the process 600 of FIG. 6A. GUI 620 is for frame synchronization for a single or a multiple host system. An Application Program Interface ("API") is used in conjunction with GUI 620 to convey information to an application 306 for communicating with a graphics module, or more particularly a GPU. Box 617 is user selectable for selecting whether to treat a particular graphics module as a primary graphics module. Sync options 618 allow for triggering on a leading or falling edge of a clock signal or an external sync signal. Thus, by selecting box 624, leading edge triggering is selected, and by selecting box 625, falling edge triggering is selected. By selecting boxes 624 and 625 triggering on both leading and falling edges is selected. Rising edge triggering is described herein, and thus may be considered a default.

Sync delay is selected via a pull-down menu 621, and refresh is selected via a pull-down menu 622. Sync delay is time to delay vertical sync from a triggering edge, rising or falling. Sync delay may be from about 0 to about 64 milliseconds (ms). Granularity of sync delay may be on the order of about 0.010 ms. A default sync delay may be about 0 ms.

Refresh rate in hertz (Hz) may be any of a variety of known refresh rates, often associated with display resolution. Such refresh rates may include those for computer displays, as well as those associated with high-definition television, including those for a Digital Video Interface (DVI).

External sync ("House Sync") may be specified to override a clock signal by putting a frequency value in hertz in box 626. Outgoing sync interval 623 may be used to delay triggering by specifying triggering on every Nth multiple of a triggering edge, leading or falling, for zero or a positive integer, for example for N from 0 to 7.

Restore defaults button 616 may be selected to restore defaults for frame synchronization. Additional functionality may include a minimum wait time between swapping back and front frame buffer content, where a default may be no wait time (i.e., 0 ms). Another additional function may include locking between frames with different but compatible refresh rates. Another additional function may be to fix frame rate to an Mth multiple of refresh rate, where M is a non-zero positive integer.

Sync and connection status portion 619 of GUI 620 is for testing sync and connections status in response to selection of test link button 615. Sync Ready status light 634 indicates whether or not a VTR signal is being properly generated between systems. Swap Ready status light 635 indicates whether or not a swap ready signal is being properly generated. Timing status icon 636 indicates whether or not an incoming synchronization signal is in phase with the internal synchronization signal. Stereo Sync icon 637 indicates whether the stereo field signal is in phase. House Sync status light 633A indicates that an external sync signal is not being properly received, while House Sync icon 633B indicates that an external sync signal is being properly received. Sync input/output port icon 631 indicates whether the sync input/output port 201 is an input or an output. (See also FIG. 2A). Sync input/output port icon 632 indicates whether the sync input/output port 202 is an input or an output. (See also FIG. 2A). Sync input/output port icons 631, 632 correspond with the sync input/output port LED's 304, 305 in FIG. 2A.

Figure 6C:
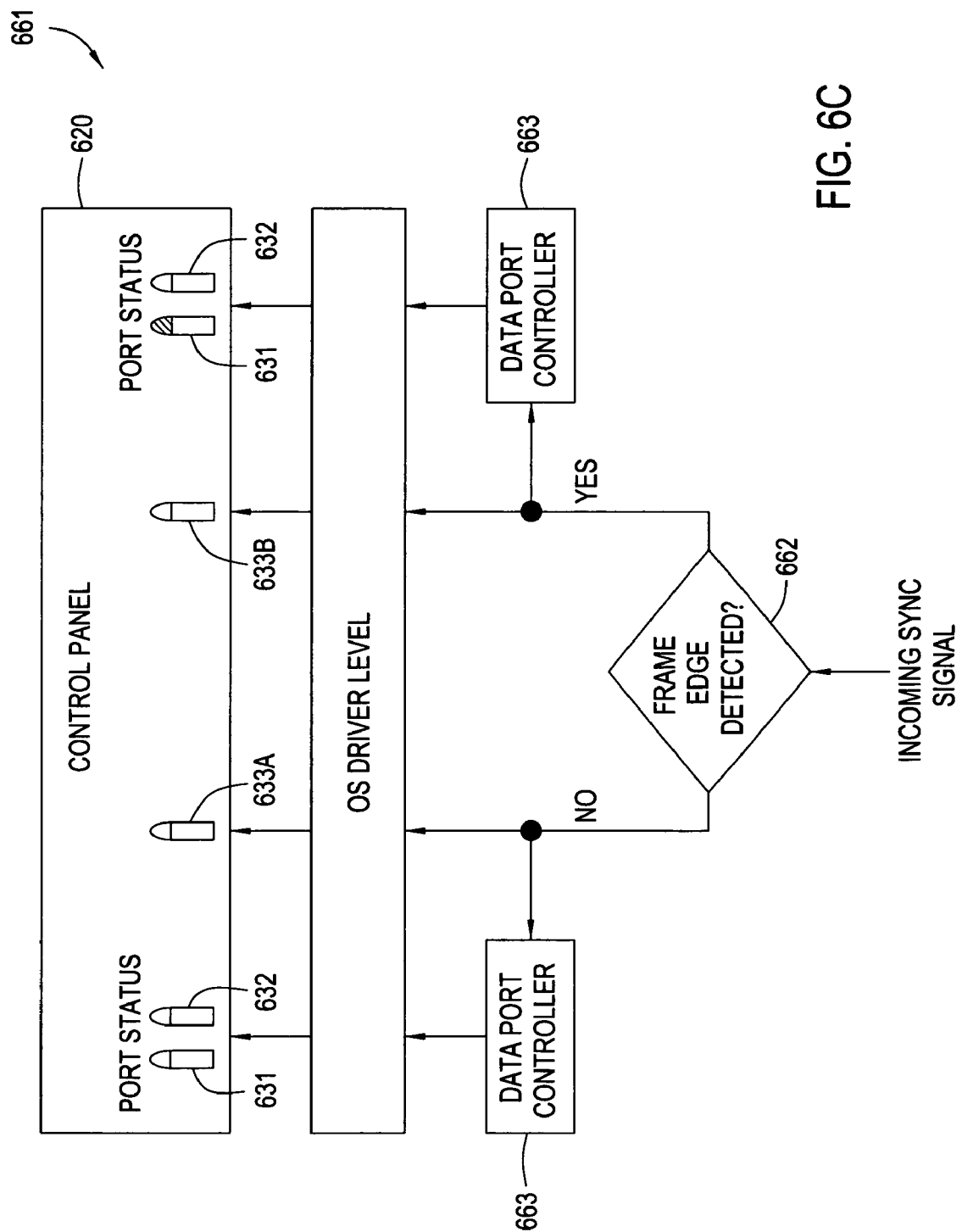
FIG. 6C depicts a relational view of a method for testing connectivity of synchronization input/output ports and external sync input port at a graphics module in accordance with one embodiment of the invention.

FIG. 6C depicts a relational view of a method for testing connectivity of synchronization input/output ports 201, 202 and external sync input port 222 at a graphics module, e.g., GFX MOD 203-1 in FIG. 2B, in accordance with one embodiment of the invention. For each frame, the controller, e.g., controller 213-1 in FIG. 2D, determines whether a frame edge has been detected at 662, where a series or stream of frame edges generally defines an incoming synchronization signal. The incoming synchronization signal may be the external sync signal 207 or a sync signal from another graphics module, e.g., GFX MOD 203-2. This detection generally occurs at the hardware level.

If a frame edge is not detected, then the data port controller 663 designates both synchronization input/output ports 201, 202 as input, and in connection with the operating system (OS) driver turns the input/output port icons 631, 632 green. In addition, the House Sync icon 633A is turned on when no frame edge is detected.

On the other hand, if a frame edge from another graphics module is detected, then the data port controller 663 designates one of the synchronization input/output ports 201, 202 as input, and in connection with the operating system (OS) driver turns the input/output port icon corresponding to that synchronization input/output port green. Further, the data port controller 663 designates the other synchronization input/output port as output, and in connection with the operating system (OS) driver turns the input/output port icon corresponding to that synchronization input/output port yellow. If a frame edge from the external sync signal 207 is detected, then the House Sync icon 633B is turned on. The display of the respective icons generally occurs at the control panel level. In this manner, the connectivity of synchronization input/output ports 201, 202 and external sync input port 222 are tested. Although green and yellow are the colors that have been discussed in connection with embodiments of the invention, other colors may also be contemplated by embodiments of the invention.

Figure 6E:
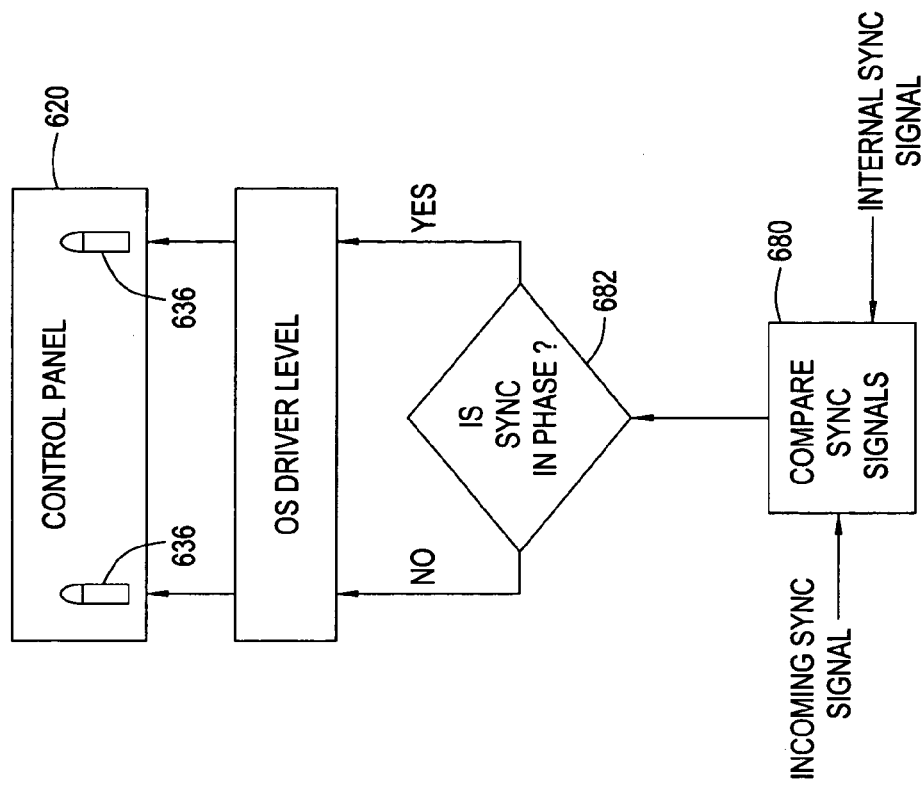
FIG. 6E depicts a relational view of a method for determining whether the synchronization signal (timing signal) from a graphics module is in phase with an incoming synchronization signal in accordance with one embodiment of the invention.
Figure 6D:
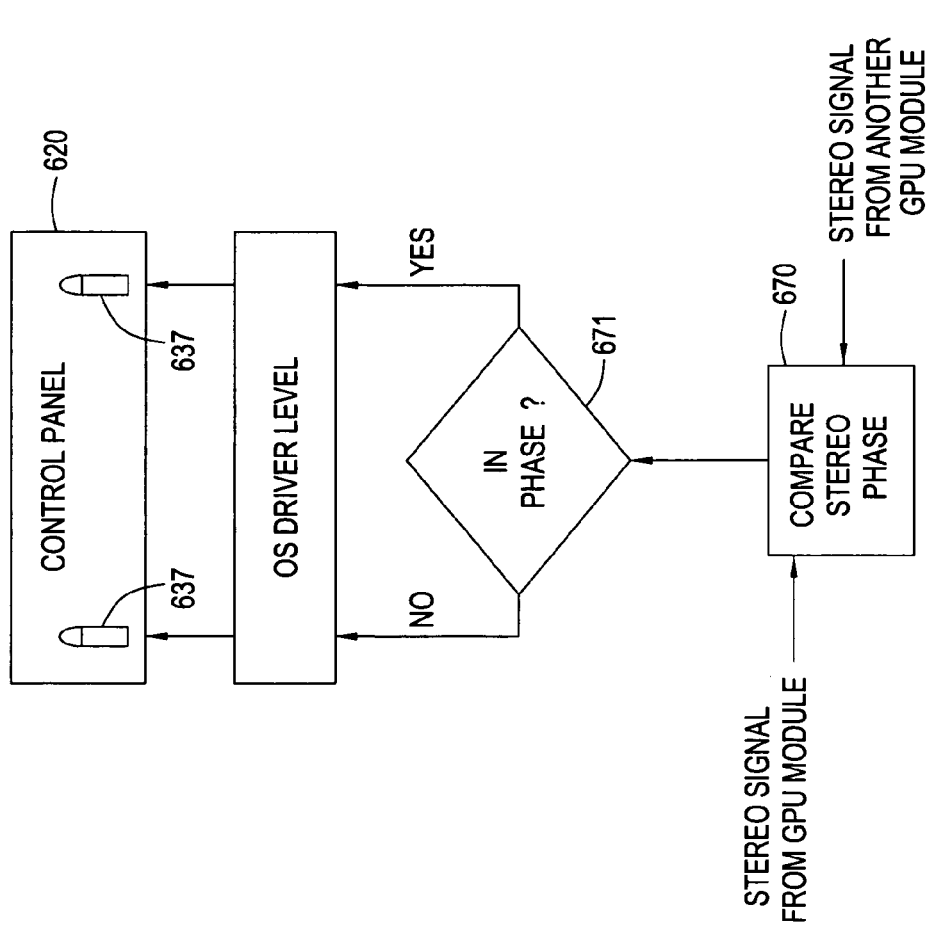
FIG. 6D depicts a relational view of a method for determining whether the stereo signal from a graphics module is in phase with the stereo signal from another graphics module in accordance with one embodiment of the invention.

FIG. 6D depicts a relational view of a method for determining whether the stereo signal from a graphics module, e.g., graphics module 203-1 in FIG. 2D, is in phase with the stereo signal from another graphics module, e.g., graphics module 203-2 in FIG. 2D, in accordance with one embodiment of the invention. At 670, the controller, e.g., controller 213-1 in FIG. 2D, compares a stereo signal from the graphics module, e.g., graphics module 203-1, with a stereo signal from the other graphics module, e.g., graphics module 203-2. Thereafter, a determination is made as to whether the stereo signals are in phase with each other (at 671). This determination generally occurs at the hardware level.

If the answer is in the negative, then the stereo sync icon 637 turns to one color, e.g., red, indicating that the stereo signals are not in phase with each other. On the other hand, if the answer is in the affirmative, then the stereo sync icon 637 turns to another color, e.g., green, indicating that the stereo signals are in phase with each other. This display of the respective icons generally occurs at the control panel level. In this manner, the stereo signals from one graphics module and another graphics module connected to the first graphics module may be determined whether they are in phase with each other.

FIG. 6E depicts a relational view of a method for determining whether the synchronization signal (timing signal) from a graphics module, e.g., graphics module 203-1 in FIG. 2D, is in phase with an incoming synchronization signal in accordance with one embodiment of the invention. At 680, the controller, e.g., controller 213-1, compares the incoming synchronization signal with the internal synchronization signal. The incoming synchronization signal may be the external sync signal 207 or a sync signal from another graphics module, e.g., GFX MOD 203-2.

At 682, a determination is made as to whether the incoming synchronization signal and the internal synchronization signal are in phase with each other. This determination generally occurs at the hardware level. If the answer is in the affirmative, then the timing status icon 636 turns to one color, e.g., green, indicating that the incoming synchronization signal and the internal synchronization signal are in phase with each other. If the answer is in the negative, then the timing status icon 636 turns to another color, e.g., red, indicating that the incoming synchronization signal and the internal synchronization signal are out of phase with each other.

Returning to FIG. 6A, after testing of sync and connection statuses at 605, at determination is made as to whether the desktop overlap is active (step 606). Desktop overlap is for creating an overlapping region of two or more projected image elements.

Figure 6F:
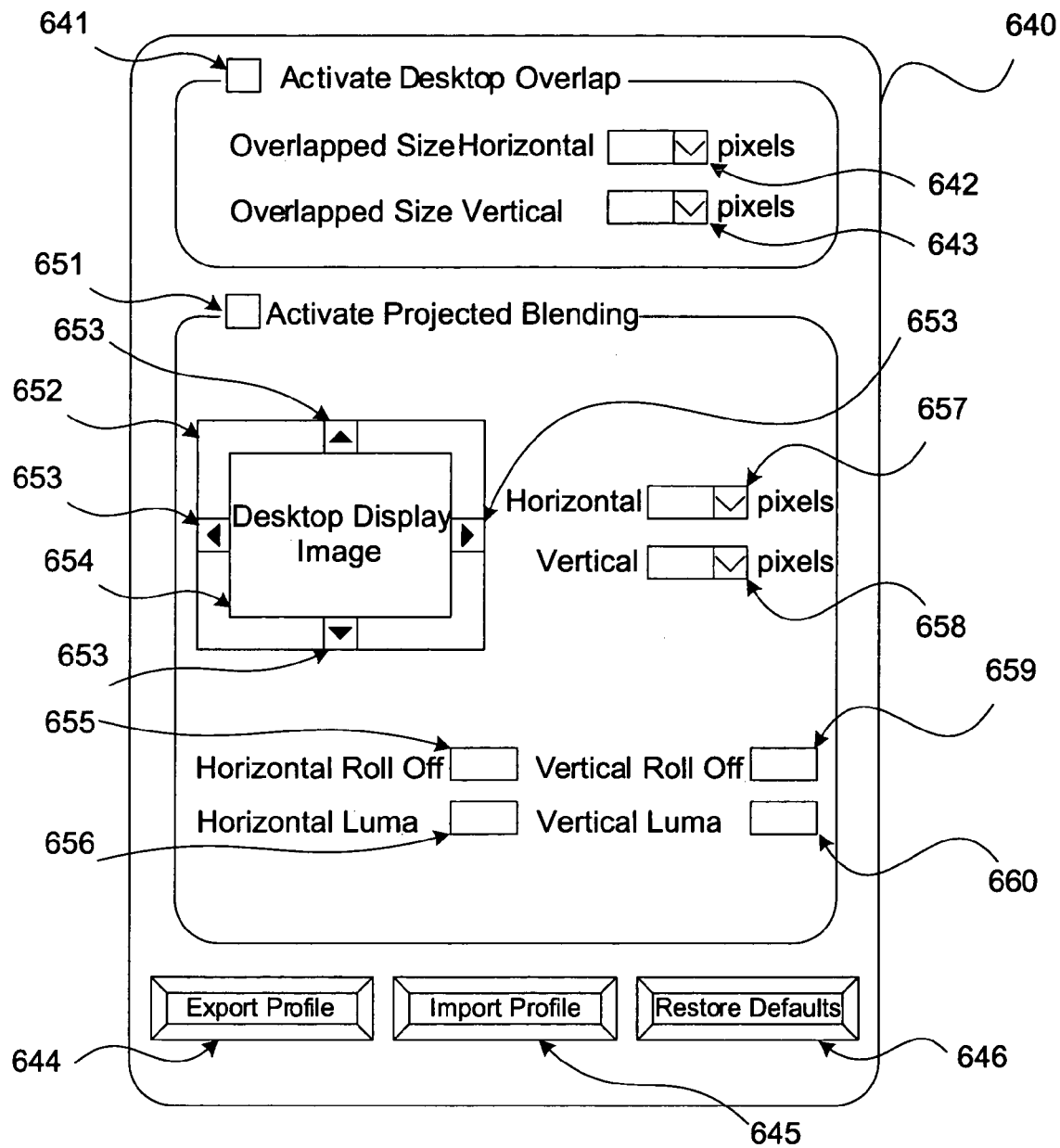
FIG. 6F is a screen view depicting an exemplary embodiment of a GUI for another portion of control flow of FIG. 6A.

FIG. 6F is a screen view depicting an exemplary embodiment of a GUI 640 for another portion of the process 600 of FIG. 6A. API is used in conjunction with GUI 640 to convey information to an application 306 for communicating with a graphics module, or more particularly a GPU. Thus, information input to a GUI may be read by an application. With continuing reference to FIG. 6F and renewed reference to FIG. 6A, GUI 640 and the remainder of the process 600 is described.

If box 641 is selected, desktop overlap is active. Desktop overlap is for display systems. Horizontal or vertical overlapping sizes may be specified on a per pixel basis, by pull-down menu, namely, pull-down menus 642 and 643, respectively, or by manual input. Notably, depending on configuration, one or both of horizontal and vertical overlap may be specified. At step 607, after setting one or more overlap sizes, such overlap sizes are read via an API for use by graphics modules, or more particularly GPU's, to adjust intensity for display roll-off.

If desktop overlap is not active at step 606, then at step 608 it is determined if projected blending is active. If at step 608 projected blending is not active, processing returns at step 699 from whence it was called. Alternatively, rather than being called up by detecting activity at a port, the process 600 may be a setup program selectable by a user. As such, if at step 608 projected blending is not active, then the user may be prompted to exit this setup program at step 699.

If at step 608 projected blending is active, for example by selecting box 651, then horizontal and vertical blending sizes may be set at 609. Notably, one or both horizontal and vertical blending sizes may be set depending on configuration of image elements. Horizontal and vertical projected blending sizes may be specified with pixel granularity via pull-down menus 657 and 658, respectively, or with manual input. Though only one entry for horizontal blending is illustratively shown, separate right and left horizontal blending entries may be used, which may be selectable in response to user movement of handles 653. Furthermore, though only one entry for vertical blending is illustratively shown, separate top and bottom vertical blending entries may be used, which may be selectable in response to user movement of handles 653. Alternatively, an image 652 of an image element may be displayed with handles 653 and a guideline 654 indexed to movement of handles 653. If separate entries for right, left, top and bottom blending are provided, each handle 653 may be moved separately to register separate entries. Thus, each handle 653 is specific to a pixel overlap indexed to an edge associated with a respective handle. Otherwise, movement of right or left handle 653 will adjust for horizontal blending, and movement of top or bottom handle 653 will adjust for vertical blending. Alternatively, handles 728 of FIG. 7A may be moved by a user as displayed on a display in association with a projected image instead of or in addition to movement of handles 653 for selection of blending values. Once set, any horizontal and vertical sizes may be read at 609 using an API.

At 610, one or more of horizontal and vertical intensity roll-off may be input in boxes 655 and 659, respectively. Again, once set, any horizontal and vertical intensity roll-off values may be read at 610 using an API.

At 611, one or more of horizontal and vertical luminance ("luma") may be input in boxes 656 and 660, respectively. Again, once set, any horizontal and vertical luma values may be read at 611 using an API.

Additionally, an intensity roll-off profile created with GUI 640 may be exported by selection of export profile button 644, and a profile may be imported into GUI 640 by selection of import profile button 645. Furthermore, defaults may be restored to GUI 640 by selection of restore defaults button 646. After all desired values are set, the process 600 may be exited or return at 699.

The following paragraphs describe how synchronized GPU's may be integrated with anti-keystoning features (described in commonly assigned U.S. patent application Ser. No. 10/185,764, entitled "METHOD AND APPARATUS FOR DISPLAY IMAGE ADJUSTMENT", filed Jun. 27, 2002, issued as U.S. Pat. No. 6,963,348) and luminosity compensation features (described in commonly assigned U.S. patent application Ser. No. 10/625,812, entitled "PER-PIXEL OUTPUT LUMINOSITY COMPENSATION", filed Jul. 22, 2003, issued as U.S. Pat. No. 7,336,277).

FIG. 7A is a block diagram depicting a projection system 700 in accordance with an embodiment of the invention. Projection system 700 includes an array of projectors 720 arranged to collectively form an image 710 from respective projected image elements 701. As such, projectors 720 are synchronized to provide the image 710.

Projection system 700 includes an M-by-N array of projectors 702 for projecting an M-by-N array of respective projected image elements; where M and N are integers, at least one of M and N is equal to or greater than one, and at least the other one of M and N is greater than one. Each projected image element 701 may be adjusted for anti-keystoning, as described in additional detail in commonly assigned U.S. patent application Ser. No. 10/185,764, entitled "METHOD AND APPARATUS FOR DISPLAY IMAGE ADJUSTMENT", filed Jun. 27, 2002, issued as U.S. Pat. No. 6,963,348, which is incorporated by reference. Though only projected image element 701-1 is illustratively shown with handles 729 for clarity, it should be understood that each projected image element 701 may be adjusted using a respective set of handles 729.

For purposes of clarity, only projected image element 701-1 is described in any detail. Projector 702-1 projects projected image element 701-1, and projector 702-2 projects projected image element 701-2. To reduce or perceptibly eliminate seam 714 between projected image elements 701-1 and 701-2, projected image elements may be projected to cover more area than their respective target regions, such as partially indicated by seams 714 and 715, such that projected image elements 701-1 and 701-2 overlap, as indicated by dashed lines 711 and 712. Thus, an overlap region 713 is created. Notably, an overlapping region, though only shown for horizontal side-to-side overlap, may exist anywhere two or more projected image elements form a seam of an image, including for example vertical side-to-side overlap as indicated by dashed lines 711 and 712.

The dimensions of overlap region 713 may be adjusted using handles 728. Handles 728 are generated just like handles 729, except rather than anti-keystoning, the projected width may be adjusted independently for each right and left side of projected image element 701-1. Further, the projected height may be adjusted independently for each top and bottom side of projected image element 701-1. Alternatively, width (horizontal dimension) and height (vertical dimension) may numerically be adjusted, as described below in additional detail.

Image content is adjustable at the image element generation level for projection into the overlap region 713 from at least one of projectors 702-1 and 702-2 to reduce or eliminate artifacts caused by such overlap, thereby providing a more seamless image 710. Additionally, projectors 702-1 and 702-2, are synchronized at the image element generation level for providing a more seamless image 710.

Figure 7B:
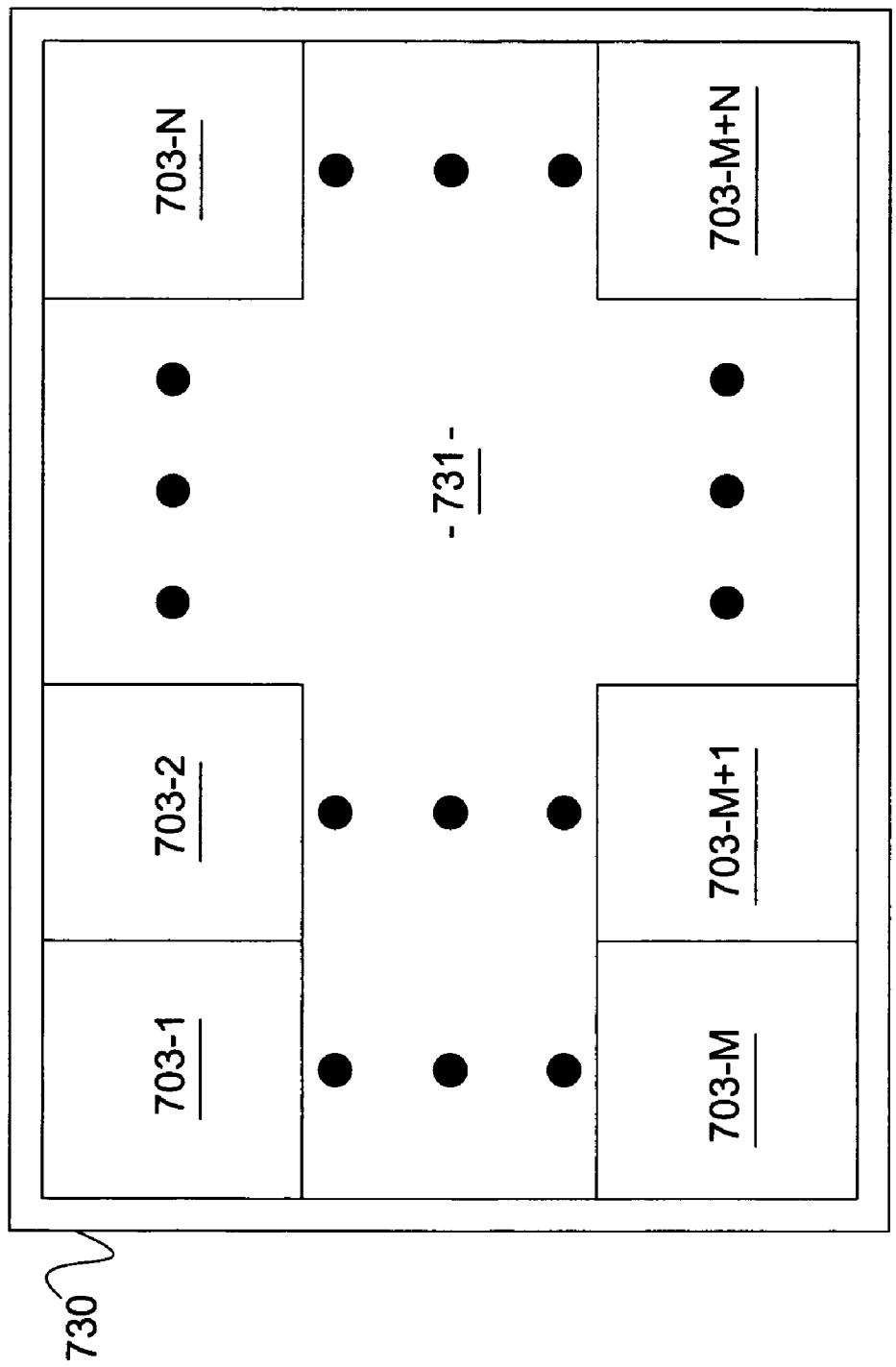
FIG. 7B is a block diagram depicting an exemplary embodiment of an array of display elements arranged to collectively form an image from respective displayed image elements.

FIG. 7B is a block diagram depicting an exemplary embodiment of an array 731 of display elements 703 for forming an image on a screen display 730. Such an image may be formed of an M-by-N array of respective display elements 703 for respectively displaying image elements; where M and N are integers, at least one of M and N is equal to or greater than one, and at least the other one of M and N is greater than one. Image content is provided for display elements 703 in a synchronous manner for forming an image on screen display 730.

In contrast to a projected image, no overlapping regions are present with multiple display devices. However, intensity roll-off along top, bottom, right and left sides of a displayed image is a known phenomenon with display elements 703, whether liquid crystal, plasma, digital light projection, or rear projection. Thus, to avoid or reduce apparent seams between respective display elements 703 used to form an image, intensity along sides is adjustable, as described below in additional detail. Further, not only can each display element 703 be separately controlled, but one or more pixels of each display element may be separately controlled. This separate control may include independently controlling luminosity for each pixel with a luminosity adjustment factor through application of a programmable luminosity filter mask, where the programmable luminosity attenuation filter mask is applied to image content by a GPU prior to sending to a display device.

Figure 7D:
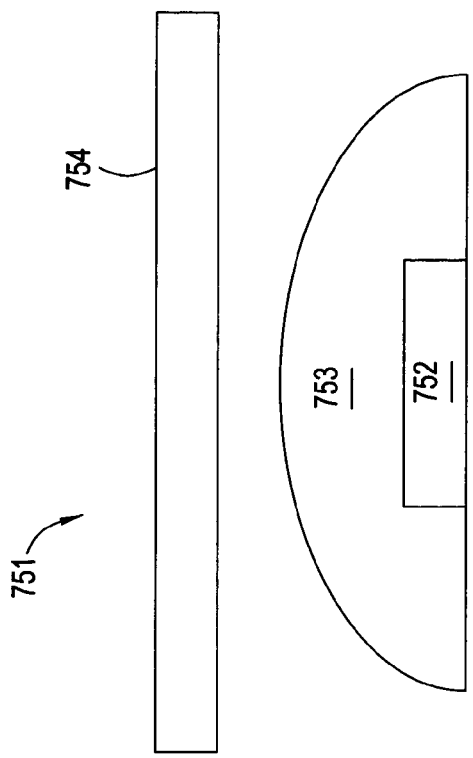
FIG. 7D is a cross-sectional view depicting an exemplary embodiment of an integrated circuit display element of FIG. 7C.
Figure 7C:
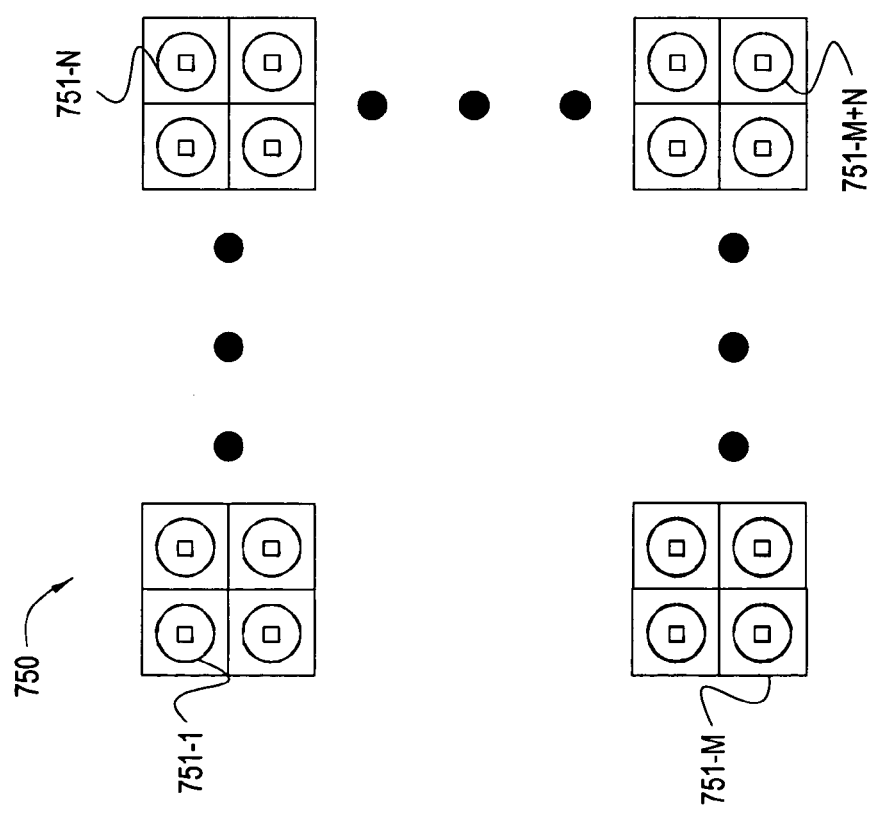
FIG. 7C is a block diagram depicting an exemplary embodiment of an array of integrated circuit display elements for collectively projecting an image.

FIG. 7C is a block diagram depicting an exemplary embodiment of an array 750 of integrated circuit display elements 751 for collectively projecting an image. Each display element 751 may be individually controlled. Furthermore, it should be understood that image content provided to each display element 751 is performed in a synchronous manner.

FIG. 7D is a cross-sectional view depicting an exemplary embodiment of an integrated circuit display element 751 of FIG. 7C. Display element 751 includes a lens cover 754, a lens 753 and an integrated circuit 752, such as a CCD integrated circuit device or other known integrated circuit for displaying, or alternatively for projecting, an image element, which may include the graphics module described with reference to FIGS. 2-6.

It should be appreciated that one or more image elements may be adjusted at the pixel generation level with at least one GPU. In other words, for image overlap for projected image elements or for an image boundary for displayed image elements, pixels may be adjusted with at least one GPU to provide a more seamless image.

FIG. 7E is a front perspective view depicting an exemplary embodiment of projection onto a spherical surface 761. In this exemplary embodiment, an image is formed of image elements 762, namely, one-eighth of a spherical surface area. Thus, for example, projector 702-A may project image element 762-A, and projector 702-B may project image element 702-B. Though, both hemispheres of spherical surface 762 are illustratively shown as used, it is possible to use less than all of the surface area of spherical surface 761 for projecting an image. Furthermore, fewer or more projectors may be used for projecting fewer or more than eight image elements 762.

FIG. 7F is a front perspective view depicting an exemplary embodiment of projection onto a portion of a cylindrical surface 771. In this exemplary embodiment, an image is formed of image elements 772, namely, one-eighth of a cylindrical surface area, excluding top and bottom surfaces. Thus, for example, projector 702-A may project image element 772-A, and projector 702-B may project image element 702-B. Though, only one-half of cylindrical surface area of cylinder 771 is illustratively shown as used, it is possible to use more or less than half of such area for projecting an image with image elements. Furthermore, fewer or more projectors may be used for projecting fewer or more than four image elements 772.

Figure 7G:
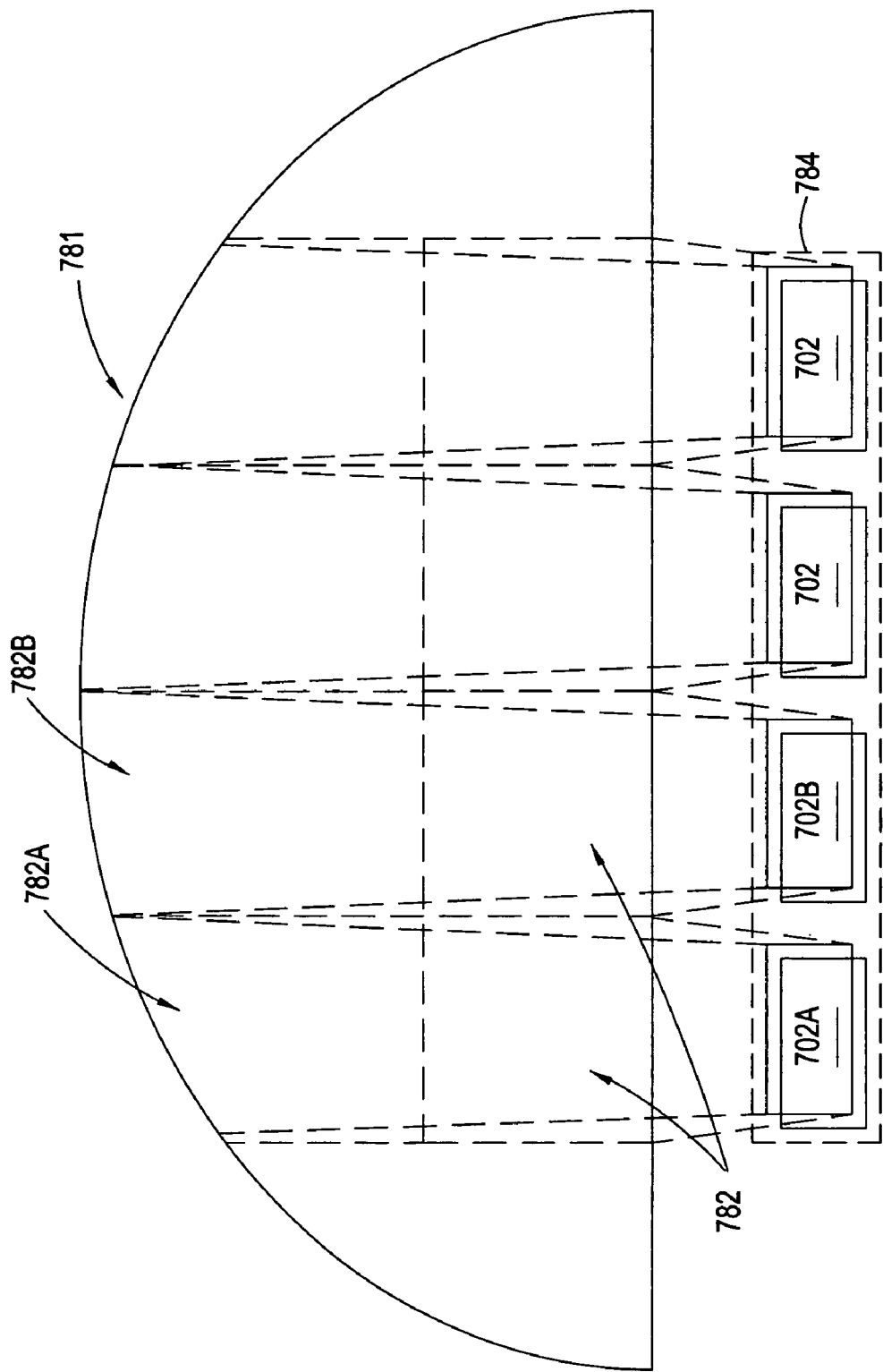
FIG. 7G is a block diagram depicting an exemplary embodiment of an array of projectors configured to project an image on an inner surface portion of a dome or dome-like structure with projected image elements adjusted for the dome's curvature.
Figure 7H:
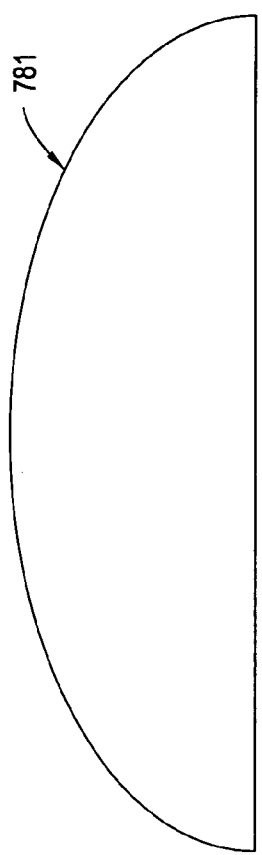
FIG. 7H is a top elevational view of dome of FIG. 7G.

FIG. 7G is a block diagram depicting an exemplary embodiment of an array of projectors 784 configured to project on an inner surface portion of a dome or dome-like structure ("dome") 781 with projected image elements 782-A and 782-B adjusted for curvature. The inner surface portion of dome 781 may be part of an IMAX theater screen. Though, only a portion of an inner surface area of dome 781 is illustratively shown as used, it is possible to use more or less of such area for projecting an image. Furthermore, fewer or more projectors may be used for projecting fewer or more than four image elements 782. In this exemplary embodiment, an image is formed of image elements 782, namely, in one-eighth image areas. Thus, for example, projector 702-A may project image element 782-A, and projector 702-B may project image element 782-B. Handles (not shown), such as handles 729 in FIG. 7A, may be placed along an edge of an image element, such as 782-A and 782-B, for adjustment to fit a curve. However, in such an embodiment, accuracy of curve fitting will be dependent at least in part on the number of handles used. Alternatively or in addition to supplying handles, a surface, such as a three-dimensional surface for a GPU, may be created by a system provider or user to display an image for a target contour. Such a surface may be created programmatically or through a user interface. A portion of image element 782-A may be projected onto a ceiling portion of dome 781. FIG. 7H is a top elevational view of dome 781 of FIG. 7G.

Figure 7J:
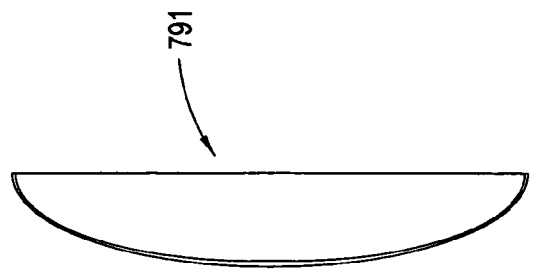
FIG. 7J is a side cross-sectional view of the display screen of FIG. 7I.
Figure 7I:
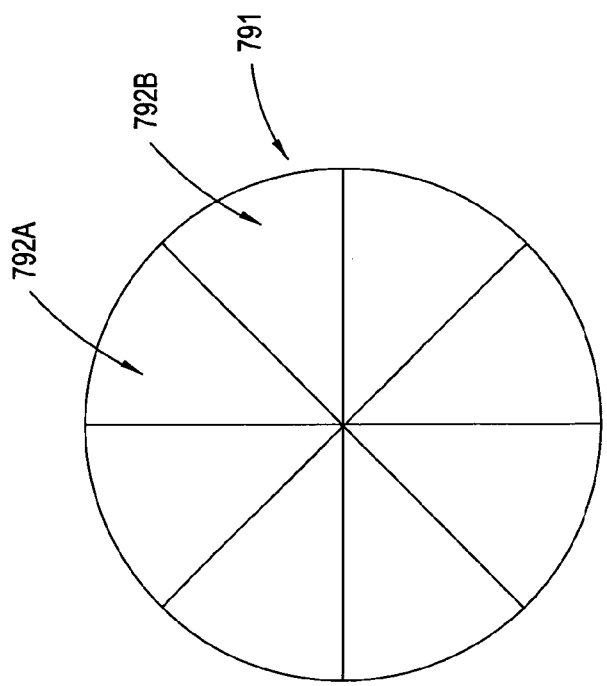
FIG. 7I is a front view depicting an exemplary embodiment of a circular display screen.

FIG. 7I is a front view depicting an exemplary embodiment of a circular display screen 791. A plurality of synchronized image elements 792 may be used to provide an image for display screen 791. For example, image elements 792-A and 792-B may be displayed and adjusted for curvature of display screen 791. Handles may be placed along an edge of image elements 792-A and 792-B for adjustment to fit a curve. The number of handles used will affect accuracy of the curve fit. Alternatively or in addition to supplying handles, a surface, such as a three-dimensional surface for a GPU, may be created by a system provider or user to display an image for a target contour. Such a surface may be created programmatically or through a user interface. For example, display screen 791 may be identified, such as by its geometric dimensions and general shape, to a GPU for display of image elements 792, where an algorithm adjusts for a circular display screen 791, or other known geometry, as well as optionally the number of image elements to be used. FIG. 7J is a side cross-sectional view of display screen 791 of FIG. 7I.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps.

What is claimed is:

1. A method for synchronizing two or more graphics processing units, comprising:
receiving a clock signal from a clock generator of a first graphics processing unit (GPU) and an external synchronization signal;
determining whether the phase of the clock signal and the phase of the external synchronization signal are synchronized;
adjusting the frequency of the clock generator to the frequency of the external synchronization signal if the phases of the clock signal and the external synchronization signal are not synchronized to generate a synchronized timing signal;
transmitting the synchronized timing signal to a second graphics processing unit (GPU); and producing an image for synchronous output to multiple displays using the synchronized timing signal, including the steps of:

generating a first portion of an image in the first graphics unit and generating a second portion of the image in the second graphics processing unit such that the first portion and the second portion synchronously form the image, and transmitting the synchronized timing signal to the first graphics processing unit and the second graphics processing unit in response to the clock signal and the synchronization signal being in phase to control the generation of the first and second image portions.

2. The method of claim 1, further comprising transmitting the synchronized timing signal from the second graphics processing unit to a third graphics processing unit.

3. The method of claim 1, further comprising:

determining whether a first stereo field signal of the first graphics processing unit and a second stereo field signal of the second graphics processing unit are synchronized; and adjusting the phase of the second stereo field signal to the phase of the first stereo field signal if the first stereo field signal and the second stereo field signal are not synchronized to generate a synchronized stereo field signal.

4. The method of claim 3, further comprising transmitting the synchronized stereo field signal from the second graphics processing unit to a third graphics processing unit.

5. The method of claim 1, further comprising synchronizing a swap ready signal of the second graphics processing unit with a swap ready signal of the first graphics processing unit.

6. The method of claim 5, wherein synchronizing the swap ready signal of the second graphics processing unit with the swap ready signal of the first graphics processing unit comprises:

receiving a frame divider;

triggering a new video start address in a memory; and determining whether a swap ready element on at least one of the graphics processing units is logically true.

7. The method of claim 6, further comprising scanning out data from the memory starting at the new video start address if the swap ready element on the at least one of the graphics processing units is logically true.

8. The method of claim 6, further comprising, prior to determining whether the swap ready element on the at least one of the graphics processing units is logically true:

determining whether the current scanline is within a video blanking interval; and scanning out the data from the memory starting at the new video start address if the swap ready element on the at least one of the graphics processing units is logically true and the current scanline is within the video blanking interval.

9. The method of claim 6, further comprising performing a series of video memory block transfers if the swap ready element on the at least one of the graphics processing units is logically true.

10. The method of claim 6, further comprising, prior to determining whether the swap ready element on the at least one of the graphics processing units is logically true:

determining whether the current scanline is within a video blanking interval; and performing the series of video memory block transfers if the swap ready element on the at least one of the graphics processing units is logically true and the current scanline is within the video blanking interval.

11. The method of claim 6, wherein the swap ready element is logically true when an image content stored in a back portion of a frame buffer in the at least one of the graphics processing units is ready to be transferred to a front portion of the frame buffer.

12. The method of claim 6, wherein the swap ready element is logically true when a voltage on the swap ready element is in a logical HIGH state.

13. The method of claim 6, wherein the swap ready element is logically true when a voltage on the swap ready element is in a logical LOW state.

14. The method of claim 1, wherein the first graphics processing unit and the second processing unit are implemented on one of a silicon substrate, a printed circuit board, and an array of display elements.

15. The method of claim 1, further comprising:

receiving a second clock signal from a clock generator of the second graphics processing unit;

determining whether the phase of the second clock signal of the second graphics processing unit and the phase of the synchronized timing signal received from the first graphics processing unit are synchronized;

adjusting the frequency of the clock generator to the frequency of the external synchronization signal if the clock signal and the external synchronization signal are not synchronized to generate a synchronized second clock signal; and producing a portion of the image using the synchronized second clock signal.

16. A method as claimed in claim 1 including:

setting a swap ready element at each of the first and second GPUs to control an immediate series of video memory block transfers at each of the first and second GPUs whose timing is controlled by the synchronized timing signal at each of first and second GPUs.

17. An apparatus for synchronizing two or more graphics processing units, comprising:

means for receiving a clock signal from a clock generator of a first graphics processing unit and an external synchronization signal;

means for determining whether the phase of the clock signal and the phase of the external synchronization signal are synchronized;

means for adjusting the frequency of the clock generator to the frequency of the external synchronization signal if the phases of the clock signal and the external synchronization signal are not synchronized to generate a synchronized timing signal;

means for transmitting the synchronized timing signal to a second graphics processing unit; and means for producing an image for synchronous output to multiple displays using the synchronized timing signal, wherein the first graphics processing unit is configured to generate a first portion of an image, and the second graphics processing unit is configured to generate a second portion of the image such that the first portion and the second portion synchronously form the image, and wherein the controller is configured to transmit the synchronized timing signal to the first graphics processing unit and the second graphics processing unit in response to the clock signal and the synchronization signal being in phase to control the generation of the first and second image portions.

18. The apparatus of claim 17, further comprising:
means for determining whether a first stereo field signal of the first graphics processing unit and a second stereo field signal of the second graphics processing unit are synchronized; and
means for adjusting the phase of the second stereo field signal to the phase of the first stereo field signal if the first stereo field signal and the second stereo field signal are not synchronized.

19. The apparatus of claim 17, further comprising means for synchronizing a swap ready signal of the second graphics processing unit with a swap ready signal of the first graphics processing unit.

20. The apparatus of claim 17, further comprising means for indicating visually that the synchronization timing signal is transmitted from the first graphics processing unit to the second graphics processing unit.

21. The apparatus as claimed in claim 17 wherein the means for producing and image is configured to:
set a swap ready element at each of the first and second GPUs to control an immediate series of video memory block transfers at each of the first and second GPUs whose timing is controlled by the synchronized timing signal at each of first and second GPUs.

* * * * *

UNITED STATES PATENT AND TRADEMARK OFFICE
CERTIFICATE OF CORRECTION

PATENT NO. : 7,483,031 B2  
APPLICATION NO. : 10/730727  
DATED : January 27, 2009  
INVENTOR(S) : Williams et al.

Page 1 of 1

It is certified that error appears in the above-identified patent and that said Letters Patent is hereby corrected as shown below:

On the coversheet, item 75, please replace "Wuerselen, CA (US)" with -- Wuerselen (DE) --.

Signed and Sealed this

Eighteenth Day of October, 2011

David J. Kappos
*Director of the United States Patent and Trademark Office*